US012609024B2

(12) United States Patent
Komori et al.

(10) Patent No.: US 12,609,024 B2
(45) Date of Patent: Apr. 21, 2026

(54) AREA MONITORING SYSTEM AND AREA MONITORING METHOD

(71) Applicant: HONDA MOTOR CO., LTD., Tokyo (JP)

(72) Inventors: Kenji Komori, Wako (JP); Yuji Yasui, Wako (JP); Hideki Matsunaga, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 161 days.

(21) Appl. No.: 18/372,722

(22) Filed: Sep. 26, 2023

(65) Prior Publication Data

US 2024/0112572 A1 Apr. 4, 2024

(30) Foreign Application Priority Data

Sep. 30, 2022 (JP) ................................ 2022-158272

(51) Int. Cl.
  *G08G 1/01* (2006.01)
  *G06V 20/56* (2022.01)
  (Continued)
(52) U.S. Cl.
  CPC ........... *G08G 1/0145* (2013.01); *G06V 20/58* (2022.01); *G06V 20/588* (2022.01);
  (Continued)
(58) Field of Classification Search
  CPC ...... B62D 6/00; B62D 101/00; B62D 113/00; B62D 119/00; B62D 137/00; G08G 1/00;
  (Continued)

(56) References Cited

U.S. PATENT DOCUMENTS 10,347,122 B2 * 7/2019 Takenaka ......... G08G 1/096716
11,643,073 B2 * 5/2023 Dax ................. G08G 1/096811
                                                   701/301

(Continued)

FOREIGN PATENT DOCUMENTS

JP      08-077487       3/1996
JP      10-063991       3/1998

(Continued)

OTHER PUBLICATIONS

Japanese Office Action for Japanese Patent Application No. 2022-158272 mailed Feb. 3, 2026.

*Primary Examiner* — Andrew Joseph Rudy
(74) *Attorney, Agent, or Firm* — Amin, Turocy & Watson, LLP

(57) ABSTRACT

According to an embodiment, an area monitoring system includes a sensor device installed at a position where a monitoring target area can be imaged, an analyzer configured to analyze an image captured by the sensor device, a manager configured to manage a movement situation of a mobile object moving on a road included in the monitoring target area on the basis of an analysis result of the analyzer, and a provider configured to provide prescribed information to the mobile object. The provider provides an action instruction for the mobile object to the mobile object when the mobile object is likely to depart from the road on the basis of the movement situation.

7 Claims, 14 Drawing Sheets

(51) Int. Cl.
  *G06V 20/58* (2022.01)
  *G08G 1/04* (2006.01)
  *H04N 7/18* (2006.01)

(52) U.S. Cl.
  CPC ......... *G08G 1/0112* (2013.01); *G08G 1/0116* (2013.01); *G08G 1/04* (2013.01); *H04N 7/183* (2013.01); *G06V 2201/08* (2022.01)

(58) Field of Classification Search
  CPC ...... G08G 1/01; G08G 1/0137; G08G 1/0145; G08G 1/0112; G08G 1/0166; G08G 1/04; G08G 1/048; G08G 1/095; G08G 1/096725; G08G 1/096708; G08G 1/096775; G08G 1/096783; G08G 1/164; G08G 1/165; G08G 1/166; G08G 1/167; G08G 1/0125; G06V 10/811; G06V 20/52; G06V 20/56; G06V 20/58; G06V 20/584; G06V 20/588; G06V 40/1365; H04N 7/183; B60W 10/06; B60W 10/08; B60W 10/18; B60W 10/20; B60W 40/02; B60W 50/00; B60W 60/001; B60W 2050/0043; B60W 2050/0075; B60W 2420/42; B60W 2420/52; B60W 2554/4041; B60W 2554/4042; B60W 2554/4045; B60W 2710/06; B60W 2710/08; B60W 2710/18; G01S 13/931; B60Q 1/26; B60Q 5/00; B60Q 9/00

USPC ......................................................... 701/117
See application file for complete search history.

(56) References Cited

U.S. PATENT DOCUMENTS

| | | | | |
|---|---|---|---|---|
| 11,827,215 B2 * | 11/2023 | Raichelgauz | ........ | G06V 10/454 |
| 11,989,950 B2 * | 5/2024 | Konishi | .............. | B60W 60/001 |
| 12,115,990 B2 * | 10/2024 | Dax | .......................... | G05D 1/65 |
| 12,412,470 B2 * | 9/2025 | Komori | .................... | G08G 1/04 |
| 2012/0148102 A1 | 6/2012 | Moriguchi et al. | | |
| 2016/0275404 A1 * | 9/2016 | Abraham | .............. | G08G 1/202 |
| 2020/0311446 A1 | 10/2020 | Nakada | | |
| 2021/0104154 A1 | 4/2021 | Yokoyama et al. | | |
| 2022/0315026 A1 * | 10/2022 | Matsunaga | ........... | B60W 30/14 |
| 2024/0054759 A1 * | 2/2024 | Hirakawa | .............. | G06V 20/53 |

FOREIGN PATENT DOCUMENTS

| | | |
|---|---|---|
| JP | 10-074296 | 3/1998 |
| JP | 2005-011251 | 1/2005 |
| JP | 2014-031167 | 2/2014 |
| JP | 2015-225366 | 12/2015 |
| JP | 2019-185220 | 10/2019 |
| JP | 2019-215785 | 12/2019 |
| JP | 2020-160481 | 10/2020 |
| JP | 2021-051466 | 4/2021 |
| JP | 2021-071919 | 5/2021 |
| WO | 2011/021588 | 2/2011 |
| WO | 2017/047687 | 3/2017 |

* cited by examiner

FIG. 10

| SENSOR TYPE | POSITION ACCURACY | SPEED ACCURACY | DETECTION RANGE | SITUATION ASCERTAINMENT | ENVIRONMENTAL RESISTANCE |
|---|---|---|---|---|---|
| STEREO CAMERA | ◎ | ○ | ○ | ◎ | △ |
| MONOCULAR CAMERA | ○ | ○ | ○ | ◎ | △ |
| FISHEYE CAMERA | △ | △ | △ | ◎ | △ |
| INFRARED CAMERA | ○ | ○ | ○ | ◎ | ○ |
| TOF CAMERA | ◎ | ○ | ◎ | △ | △ |
| RADAR DEVICE | ○ | ◎ | ◎ | △ | ◎ |
| LIDAR SENSOR | ◎ | ○ | △ | ○ | ○ |
| MICROPHONE | △ | △ | △ | △ | ○ |

AREA MONITORING SYSTEM AND AREA MONITORING METHOD

CROSS-REFERENCE TO RELATED APPLICATION

Priority is claimed on Japanese Patent Application No. 2022-158272, filed Sep. 30, 2022, the content of which is incorporated herein by reference.

BACKGROUND

Field of the Invention

The present invention relates to an area monitoring system and an area monitoring method.

Description of Related Art

In recent years, efforts to provide access to sustainable transportation systems that take into account vulnerable groups among traffic participants have become active. To implement these, research and development for further improving traffic safety and convenience through research and development relating to safety precaution technology are being focused on. In relation to this, conventionally, technology for outputting a warning when a vehicle departs from a travel lane using a sensor mounted in the vehicle or determining the start of movement of a physical object using detection results of a plurality of detectors is known (for example, Japanese Unexamined Patent Application, First Publication Nos. 2014-31167 and 2021-51466).

SUMMARY

Meanwhile, in the technology relating to safety precautions, a state of a mobile object moving within an area or a state of a road may not be accurately ascertained due to changes in a situation relating to a monitoring target area and the like. Therefore, there is a possibility that it will be impossible to appropriately monitor the monitoring target area.

In order to solve the above problems, an objective of the present application is to provide an area monitoring system and an area monitoring method capable of more appropriately monitoring a monitoring target area. In turn, it will contribute to the development of a sustainable transportation system.

An area monitoring system and an area monitoring method according to the present invention adopt the following configurations.

(1): According to an aspect of the present invention, there is provided an area monitoring system including: a sensor device installed at a position where a monitoring target area can be imaged; an analyzer configured to analyze an image captured by the sensor device; a manager configured to manage a movement situation of a mobile object moving on a road included in the monitoring target area on the basis of an analysis result of the analyzer; and a provider configured to provide prescribed information to the mobile object, wherein the provider provides an action instruction for the mobile object to the mobile object when the mobile object is likely to depart from the road on the basis of the movement situation.

(2): In the above-described aspect (1), the analyzer assigns identification information for each mobile object on the basis of a shape of the mobile object included in the image, and the manager manages a movement situation for each mobile object on the basis of the assigned identification information.

(3): In the above-described aspect (1), the analyzer measures a travel period of time in which the mobile object travels in a prescribed segment included within the image, and the manager estimates that an abnormality has occurred in the mobile object or the monitoring target area when a difference between the travel period of time and a prescribed reference travel period of time is greater than or equal to a threshold value.

(4): In the above-described aspect (1), the manager determines that the mobile object is slipping when a change amount in a prescribed period of time at an angle formed by an extension direction of the road and a travel direction of the mobile object is greater than or equal to a threshold value.

(5): In the above-described aspect (1), the manager manages a movement situation of the mobile object using an image from another mobile object capable of imaging a mobile object moving in a blind spot area not included in the sensor device within the monitoring target area when the mobile object moves in the blind spot area.

(6): In the above-described aspect (1), a plurality of sensor devices are provided in the monitoring target area, and the manager predicts the occurrence of an abnormality of the mobile object when the mobile object is predicted to deviate from a sensor range of a first sensor device and move toward a sensor range of a second sensor device and when the second sensor device has not detected the mobile object within a prescribed period of time.

(7): In the above-described aspect (6), the manager estimates that the mobile object has moved to a branching road when the second sensor device has not detected the mobile object within a prescribed period of time and when the branching road is located between a sensor range of the first sensor device and a sensor range of the second sensor device.

(8): According to another aspect of the present invention, there is provided an area monitoring method including: analyzing, by a computer, an image captured by a sensor device installed at a position where a monitoring target area can be imaged; managing, by the computer, a movement situation of a mobile object moving on a road included in the monitoring target area on the basis of an analysis result; providing, by the computer, prescribed information to the mobile object; and providing, by the computer, an action instruction for the mobile object to the mobile object when the mobile object is likely to depart from the road on the basis of the movement situation.

According to the above-described aspects (1) to (8), it is possible to more appropriately monitor a monitoring target area.

BRIEF DESCRIPTION OF THE DRAWINGS

FIG. 10 is a diagram showing an example of characteristic information for a sensor type.

DESCRIPTION OF EMBODIMENTS

Hereinafter, embodiments of an area monitoring system and an area monitoring method of the present invention will be described with reference to the drawings. Mobile objects in the area monitoring system of the embodiment include a physical object capable of moving on a road such as a vehicle with two, three, or four wheels or the like, a bicycle, or a person (a pedestrian). "Roads" may include not only roads (lanes) dedicated to vehicles, but also roads, passages, road surfaces, areas having a prescribed size and length in which vehicles and people can move, and the like. Vehicles includes any vehicle capable of being boarded by a person (a driver) and moving on the road surface, for example, a single-seater vehicle (micromobility) and the like. In the following description, the vehicle will be described as four-wheeled micromobility. Although a case in which left-hand traffic regulations are applied will be described below, it is only necessary to reverse the left and right when right-hand traffic regulations are applied.

[System Configuration]

Figure 1:
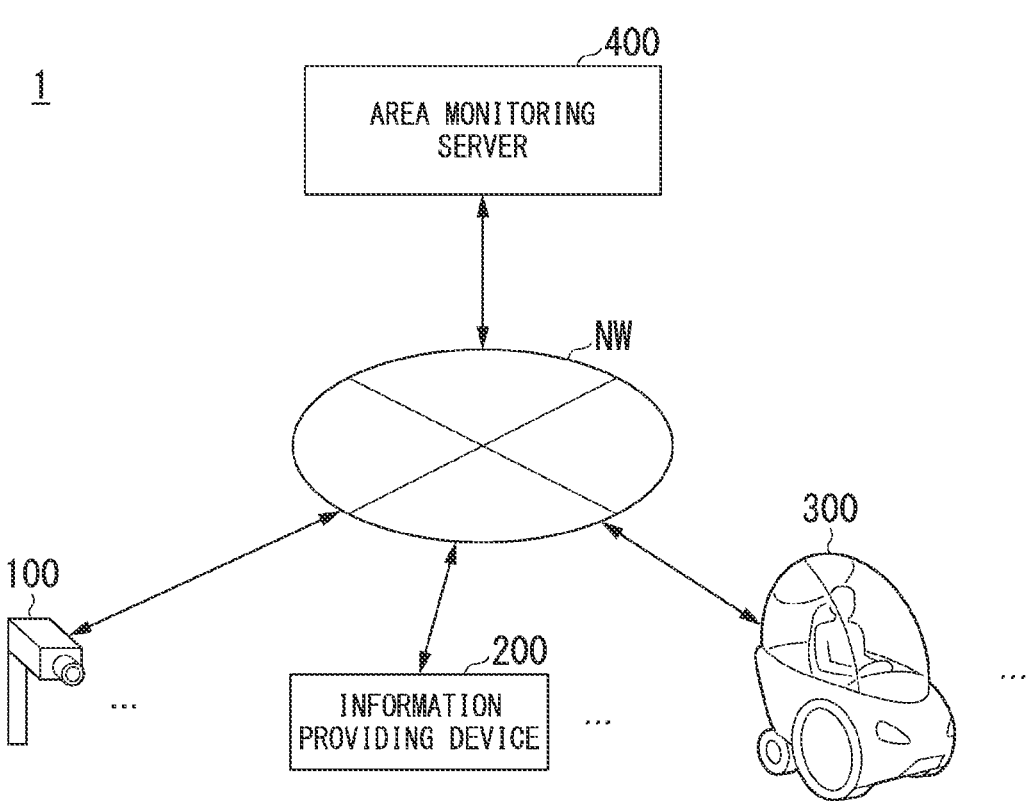
FIG. 1 is a diagram showing an example of a configuration of an area monitoring system according to an embodiment.

FIG. 1 is a diagram showing an example of a configuration of an area monitoring system 1 according to an embodiment. The area monitoring system 1 shown in FIG. 1 includes, for example, a sensor device 100, an information providing device 200, a vehicle 300, and an area monitoring server 400. These are communicatively connected, for example, via a network NW. The network NW includes, for example, the Internet, a cellular network, a Wi-Fi network, a wide area network (WAN), a local area network (LAN), a provider device, a wireless base station, and the like. The area monitoring system 1 may include one or more of the sensor device 100, the information providing device 200, the vehicle 300, and the area monitoring server 400. The area monitoring system 1 may have a configuration that does not include at least one of the information providing device 200 or the vehicle 300. The area monitoring system 1 may transmit and receive information to and from each configuration via one or more relay devices (for example, gateway devices and small servers).

The sensor device 100 detects a physical object located in the monitoring target area. The monitoring target area is, for example, an area including a road where a mobile object such as a traffic participant such as the vehicle 300, a pedestrian, or a bicycle passes. A plurality of sensor devices 100 are installed at prescribed intervals along a road or the like when the monitoring target area is a road or the like. The sensor device 100 may include an optical sensor and a radio wave sensor. The optical sensor is, for example, a camera device (an image sensor) such as a digital camera. Specifically, optical sensors include a stereo camera, a monocular camera, a fisheye camera, an infrared camera, and the like. Radio wave sensors include a radar device, a light detection and ranging (LIDAR) sensor, a time of flight (TOF) camera, and the like. The radar device emits radio waves such as millimeter waves around the sensor device 100 and detects radio waves (reflected waves) reflected by the physical object to detect at least a position (distance and direction) of the physical object. The LIDAR sensor applies light (or electromagnetic waves having a wavelength close to that of light) around the sensor device 100 and measures scattered light. The LIDAR sensor detects a distance from the sensor device 100 to the target on the basis of a period of time from light emission to light reception. The applied light is, for example, pulsed laser light. When the monitoring target area is a road, the sensor device 100, for example, is installed to image an area including a road from above the road. Sensor ranges (imaging ranges) of the plurality of sensor devices 100, which are installed, may or may not overlap at least partly.

The information providing device 200 is installed near the monitoring target area and provides information to the vehicle 300 and traffic participants passing through the monitoring target area. The information providing device 200 may be a terminal device (for example, a smartphone or a tablet terminal) owned by a manager (a maintenance staff member) who maintains (manages) the monitoring target area.

The vehicle 300, for example, travels with motive power output in accordance with an operation of an internal combustion engine operating with fuel such as gasoline, diesel oil, or hydrogen. The vehicle 300 may travel with an electric motor driven by electric power supplied from a battery. The battery is, for example, a lithium-ion secondary battery (LIB), a nickel-metal hydride battery, an all-solid-state battery, or the like. The vehicle 300 may be a hybrid vehicle using the above-described internal combustion engine or electric motor as a drive source. An internal combustion engine or electric motor is an example of a power source mounted in the vehicle 300.

The area monitoring server 400 monitors a situation of a monitoring target area (for example, a situation of a mobile object moving within the area, a situation of a road surface, or an installation situation of the sensor device 100) on the basis of information obtained from the sensor device 100 or the vehicle 300 via the network NW and causes information based on a monitoring result to be output through the information providing device 200. The area monitoring server 400 may be implemented, for example, in a server device or a storage device incorporated in a cloud computing system. In this case, the function of the area monitoring server 400 may be implemented by a plurality of server devices or a plurality of storage devices in the cloud computing system.

Next, functional configurations of the sensor device 100, the information providing device 200, the vehicle 300, and the area monitoring server 400 will be specifically described.

[Sensor Device]

Figure 2:
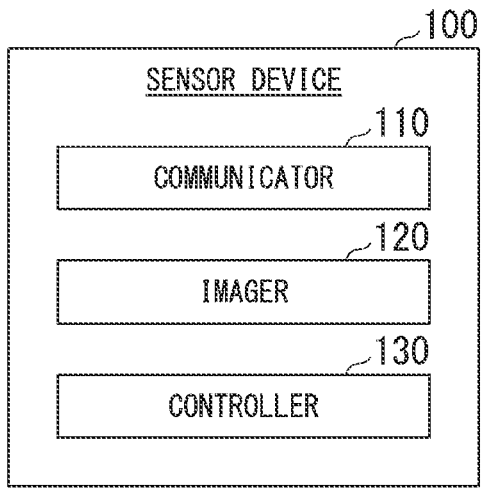
FIG. 2 is a diagram showing an example of a configuration of a sensor device.

FIG. 2 is a diagram showing an example of a configuration of the sensor device 100. In the example of FIG. 2, a configuration when the sensor device 100 is a camera device is shown. The sensor device 100 includes, for example, a communicator 110, an imager 120, and a controller 130.

The communicator 110 communicates with the area monitoring server 400 and other external devices via the network NW. For example, the communicator 110 transmits captured image data from the imager 120 to the area monitoring server 400. The communicator 110 may transmit information received from the area monitoring server 400 to the information providing device 200 or the vehicle 300 located in a nearby area.

The imager 120 is a digital camera using, for example, a solid-state image sensor such as a charge-coupled device (CCD) or a complementary metal oxide semiconductor (CMOS). The imager 120 iteratively images an area including the monitoring target area at a prescribed interval and at a prescribed timing. An angle of view (an imaging area) of the imager 120 is fixed. The imager 120 may be a stereo camera, a monocular camera, a fisheye camera, an infrared camera, or the like.

When the sensor device 100 is a radio wave sensor, a radar device, a LIDAR sensor, a TOF camera, or the like is provided instead of (or in addition to) the imager 120. A microphone configured to collect an ambient sound may be provided in the sensor device 100.

The controller 130 controls an overall configuration of the sensor device 100. For example, the controller 130 transmits sensor data including an image captured by the imager 120 (hereinafter referred to as a camera image), imaging date and time information, and identification information (for example, a sensor ID) for identifying the sensor device 100 to the area monitoring server 400 via the network NW. The sensor data may include information obtained by various types of sensors such as a radar device, a LIDAR sensor, and a microphone in addition to (or instead of) a camera image.

[Information Providing Device]

Figure 3:
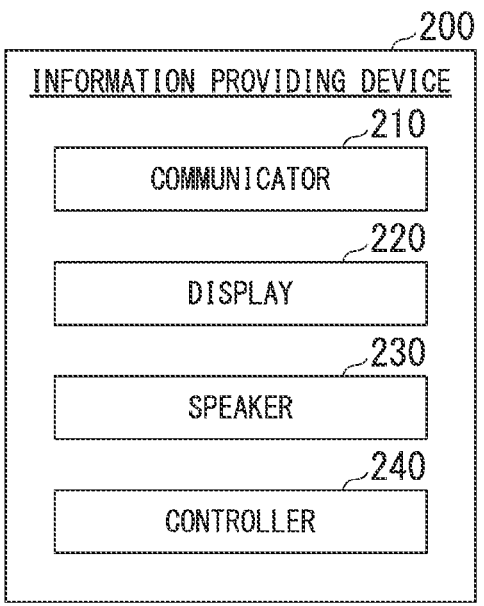
FIG. 3 is a diagram showing an example of a configuration of an information providing device.

FIG. 3 is a diagram showing an example of a configuration of the information providing device 200. The information providing device 200 includes, for example, a communicator 210, a display 220, a speaker 230, and a controller 240.

The communicator 210 communicates with the area monitoring server 400 and other external devices via the network NW. For example, the communicator 210 receives various types of information transmitted from the area monitoring server 400.

The display 220 displays an image relating to information provided by the area monitoring server 400. The display 220 is, for example, a digital signage system such as an electronic bulletin board or an electronic signboard. The speaker 230 outputs a sound relating to the information provided from the area monitoring server 400. It is only necessary for the information providing device 200 to include at least one of the display 220 and the speaker 230.

The controller 240 controls an overall configuration of the information providing device 200. For example, the controller 240 generates an image or a sound relating to information provided by the area monitoring server 400 and causes the generated image or sound to be output from the display 220 or the speaker 230. When an image or sound is provided from the area monitoring server 400, the controller 240 may cause the image or sound to be output to the display 220 or the speaker 230 as it is.

A light emitter may be provided in the information providing device 200 instead of (or in addition to) the configuration described above. The light emitter turns on or flashes, for example, a light emitting body provided at least in a part of a road surface marking such as a stop line or a pedestrian crossing provided on a road in the monitoring target area. The light emitter is, for example, a light emitting diode (LED), but is not limited thereto. The light emitter may emit light around the display or at least a part thereof. The light emitter may emit light in a prescribed color or may emit light in a color indicated by the controller 240. The controller 240 causes the light emitter to emit light according to an instruction from the area monitoring server 400. The light emitter is provided, for example, at a pedestrian crossing for crossing a road or a stop line for stopping the movement of a vehicle.

[Vehicle]

Figure 4:
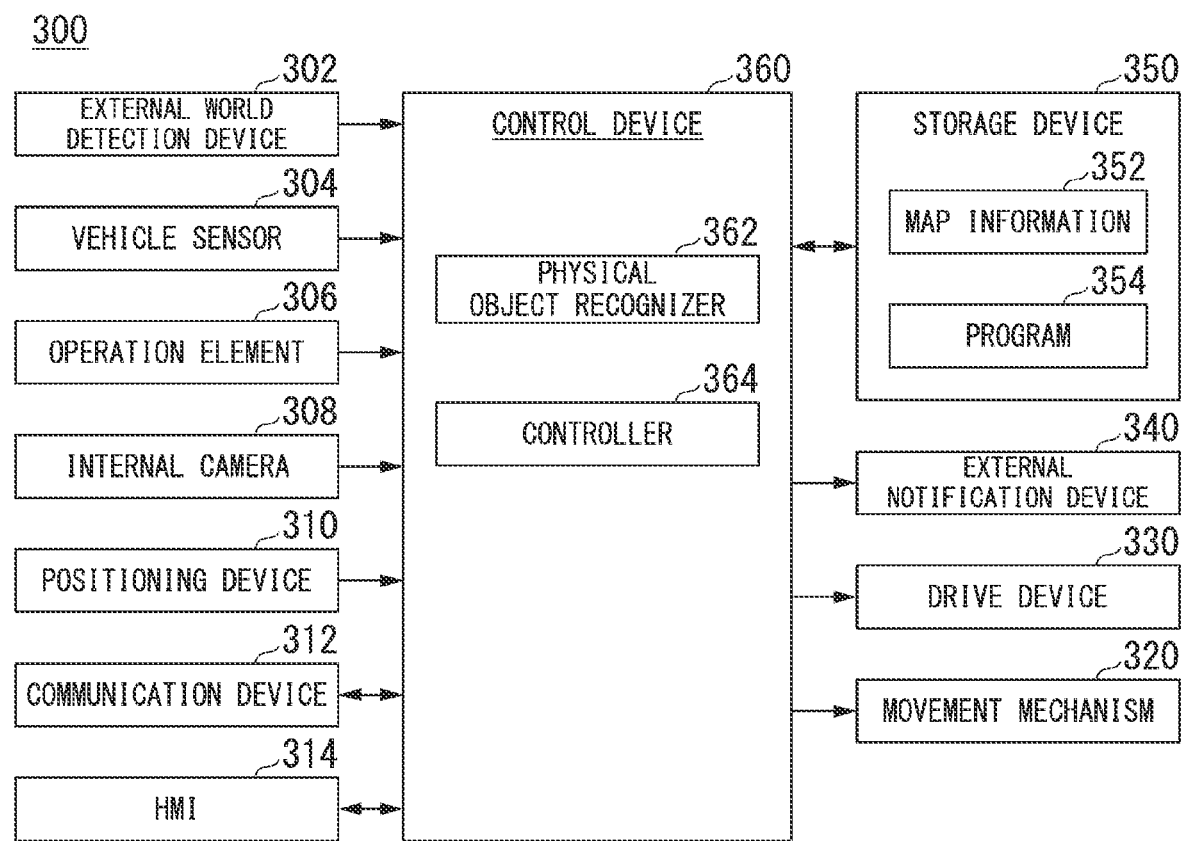
FIG. 4 is a diagram showing an example of a configuration of a vehicle.

FIG. 4 is a diagram showing an example of a configuration of the vehicle 300. The vehicle 300 includes, for example, an external world detection device 302, a vehicle sensor 304, an operation element 306, an internal camera 308, a positioning device 310, a communication device 312, a human-machine interface (HMI) 314, a movement mechanism 320, a drive device 330, an external notification device 340, a storage device 350, and a control device 360. Among these components, some components that are not essential for implementing the functions of the present invention may be omitted.

The external world detection device 302 detects an external situation of the vehicle 300. For example, the external world detection device 302 includes various types of devices having a detection range of at least a part (including a travel direction) around the vehicle 300. The external world detection device 302 includes an external camera, a radar device, a LIDAR sensor, a sensor fusion device, and the like. The external camera is, for example, a digital camera using a solid-state image sensor such as a charge-coupled device (CCD) or a complementary metal oxide semiconductor (CMOS). The external camera is attached to any location in the vehicle 300. When the view in front of the vehicle is imaged, the external camera is attached to an upper part of a front windshield, a rear surface of a rearview mirror, or the like. The external camera periodically and iteratively images the surroundings (surroundings including the travel direction) of the vehicle 300. The external camera may be a stereo camera, a monocular camera, a fisheye camera, or the like.

The radar device radiates radio waves such as millimeter waves around the vehicle 300 and detects at least a position (a distance to and a direction) of a physical object by detecting radio waves (reflected waves) reflected by the physical object. The radar device is attached to any location on the vehicle 300. The vehicle 300 may detect a position and a speed of the physical object in a frequency-modulated continuous wave (FM-CW) scheme. The LIDAR sensor radiates light (or electromagnetic waves having a wavelength close to light) to the vicinity of the vehicle 300 and measures scattered light. The LIDAR sensor detects a distance from the vehicle 300 to a target on the basis of a period of time from light emission to light reception. The LIDAR sensor is attached to any location on the vehicle 300. The external world detection device 302 outputs information indicating a detection result (an image, a position of a physical object, or the like) to the control device 360.

The vehicle sensor 304 includes, for example, a speed sensor, an acceleration sensor, a yaw rate (angular rate) sensor, a direction sensor, an operation amount detection sensor attached to the operation element 306, and the like.

The operation element 306 accepts a driving operation from an occupant of the vehicle 300. The operation element 306 includes, for example, an operation element (for example, an accelerator pedal, a brake pedal, a dial switch, or a lever) for issuing an acceleration/deceleration instruction and an operation element (for example, a steering wheel) for issuing a steering instruction. In this case, the vehicle sensor 304 may include an accelerator opening degree sensor, a brake depression amount sensor, a steering torque sensor, and the like. The vehicle 300 may include an operation element of a form other than the above (for example, a non-annular rotation operation element, a joystick, a button, or the like) as the operation element 306.

The internal camera 308 images at least the head of the occupant of the vehicle 300 from the front. The internal camera 308 is a digital camera that uses an imaging element such as a CCD or a CMOS. The internal camera 308 outputs the captured image to the control device 360.

The positioning device 310 is a device for measuring a position of the vehicle 300. The positioning device 310 is, for example, a global navigation satellite system (GNSS) receiver and identifies the position of the vehicle 300 on the basis of a signal received from a GNSS satellite and outputs the identified position as position information. Also, the position information of the vehicle 300 may be estimated from a position of a Wi-Fi base station to which the communication device 312 is connected. The positioning device 310 may include the vehicle sensor 304.

The communication device 312 communicates with another vehicle located in a nearby area using, for example, a cellular network, a Wi-Fi network, Bluetooth (registered trademark), dedicated short-range communication (DSRC), or the like, or communicates with various types of external devices (for example, the area monitoring server 400, the sensor device 100, and the information providing device 200) via a radio base station.

The HMI 314 presents various types of information (or provides a notification) to the occupant of the vehicle 300 and receives an input operation from the occupant. The HMI 314 includes various types of display devices, a speaker, a microphone, a buzzer, a touch panel, a switch, keys, a lamp, and the like. The HMI 314 is an example of an "internal notification device." For example, the HMI 314 notifies the occupant of the travel state of the vehicle 300 controlled by the control device 360 in a notification mode that varies with a difference in the travel state. The HMI 314, for example, presents information from the control device 360 or presents information acquired from an external device with the communication device 312.

The movement mechanism 320 is a mechanism for moving the vehicle 300 on a road. The movement mechanism 320 is, for example, a wheel group including a steered wheel and a drive wheel. Also, the movement mechanism 320 may be a leg for multi-legged walking.

The drive device 330 outputs a force to the movement mechanism 320 and moves the vehicle 300. For example, the drive device 330 includes a motor for driving the drive wheel, a battery for storing electric power supplied to the motor, a steering device for adjusting a steering angle of the steered wheel, and the like. The drive device 330 may include an internal combustion engine, a fuel cell, or the like as a driving force output means or a power generation means. Also, the drive device 330 may further include a brake device due to friction force or air resistance. The drive device 330 may control the traveling of the vehicle 300 on the basis of information about steering control and speed control from the area monitoring server 400 instead of (or in addition to) operation content (a manual driving operation) of the operation element 306.

The external notification device 340 is, for example, a lamp, a display device, a speaker, or the like provided on an outer panel of the vehicle 300 and configured to provide an information notification to the outside of the vehicle 300. For example, the external notification device 340 provides a notification of the travel state of the vehicle 300 controlled by the control device 360 in the vicinity of the mobile object (within a prescribed distance from the vehicle 300) in a notification mode that varies with a difference in the travel state.

Figure 5:
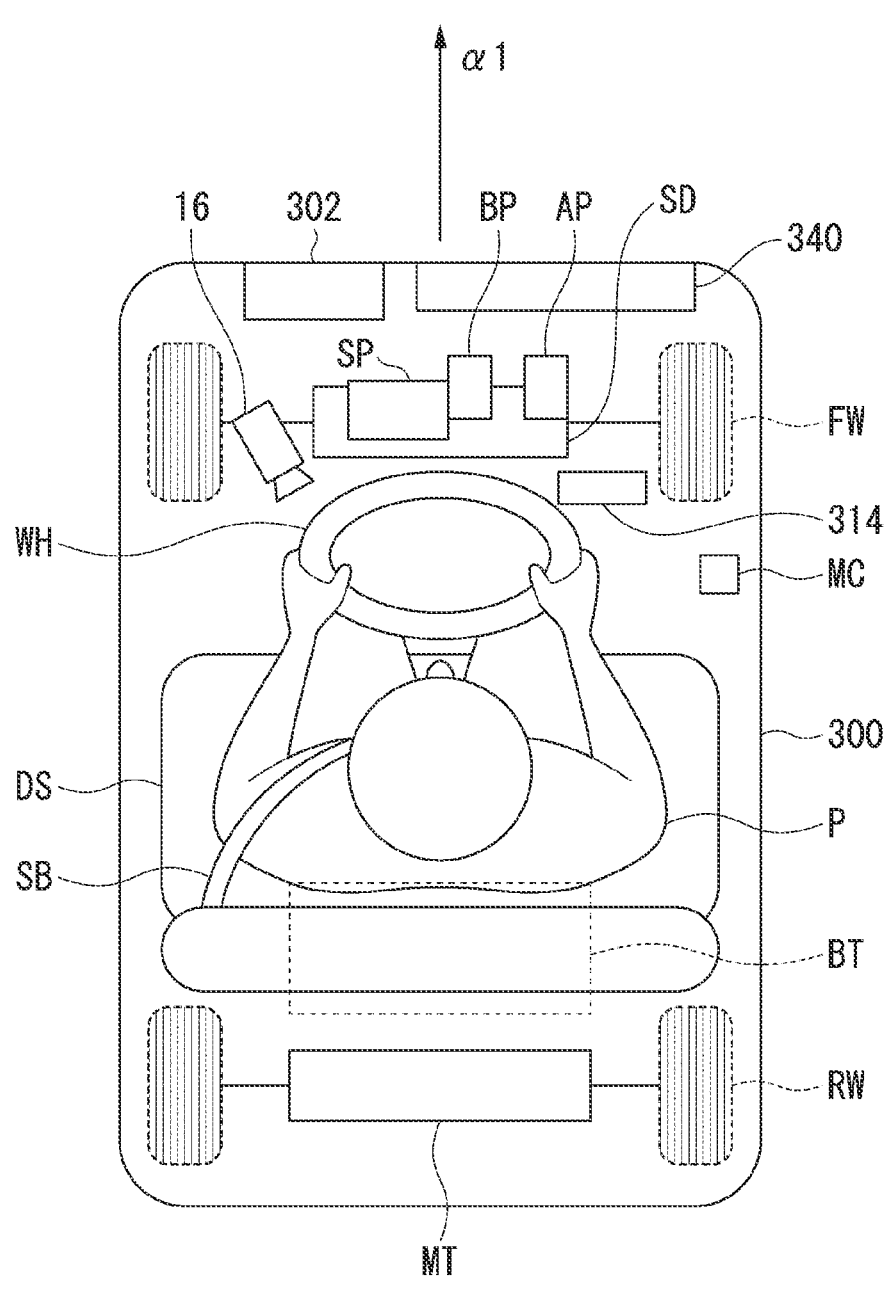
FIG. 5 is a perspective view of a vehicle seen from above.

FIG. 5 is a perspective view of the vehicle 300 seen from above. In FIG. 5, FW denotes a steered wheel, RW denotes a drive wheel, SD denotes a steering device, MT denotes a motor, and BT denotes a battery. The steering device SD, the motor MT, and the battery BT are included in the drive device 330. Also, AP denotes an accelerator pedal, BP denotes a brake pedal, WH denotes a steering wheel, SP denotes a speaker, and MC denotes a microphone. The vehicle 300 shown in FIG. 5 is a single-seater four-wheeled vehicle and an occupant P sits in a driver's seat DS and wears a seat belt SB. An arrow al is a travel direction (speed vector) of the vehicle 300.

The external world detection device 302 is provided near the front end of the vehicle 300 and the internal camera 308 is provided at a position where the head of the occupant P can be imaged from the front of the occupant P. The external notification device 340 serving as a display device is provided near the front end of the vehicle 300. In front of the occupant P inside of the mobile object, the HMI 314 serving as the display device is provided. The external notification device 340 may be formed integrally with a speaker SP and the HMI 314 may be formed integrally with the speaker SP and a microphone MC.

Returning to FIG. 4, the storage device 350 is a non-transitory storage device such as, for example, a hard disk drive (HDD), a flash memory, or a random-access memory (RAM). The storage device 350 stores map information 352, a program 354 executed by the control device 360, and the like. The map information 352 includes, for example, road information associated with position information (a road shape (a width, curvature, and a slope) and positions of a stop line and a pedestrian crossing), point of interest (POI) information, traffic regulation information, address information (an address/postal code), facility information, telephone number information, and the like. The position information includes latitude and longitude. Although the storage device 350 outside of the frame of the control device 360 is described in FIG. 4, the storage device 350 may be included in the control device 360.

[Control Device]

The control device 360 includes, for example, a physical object recognizer 362 and a controller 364. For example, the physical object recognizer 362 and the controller 364 are implemented by a hardware processor such as a central processing unit (CPU) executing the program (software) 354. Also, some or all of these components may be implemented by hardware (including a circuit; circuitry) such as a large-scale integration (LSI) circuit, an application-specific integrated circuit (ASIC), a field-programmable gate array (FPGA), or a graphics processing unit (GPU) or may be implemented by software and hardware in cooperation.

The program may be pre-stored in the storage device 350 or may be stored in a removable storage medium (a non-transitory storage medium) such as a DVD or a CD-ROM and installed in the storage device 350 when the storage medium is mounted in a drive device.

The physical object recognizer 362 recognizes a surrounding situation of the vehicle 300 on the basis of an output of the external world detection device 302. For example, the physical object recognizer 362 recognizes a physical object located within a prescribed distance from the vehicle 300. Physical objects include some or all of mobile objects such as a vehicle, a bicycle, and a pedestrian, runway boundaries such as a road marking, a step, a guardrail, a shoulder, and a median strip, structures installed on the road such as a road sign and a signboard, and an obstacle such as a falling object that exists (falls) on the runway. For example, the physical object recognizer 362 acquires information of the presence, position, type, and the like of another mobile object by inputting an image captured by the external camera to a trained model trained to output the information of the presence, position, and type of a physical object when the image captured by the external camera of the external world detection device 302 is input. Other types of mobile objects can also be estimated on the basis of a size in the image, an intensity of a reflected wave received by a radar device of the external world detection device 302, and the like. Also, the physical object recognizer 362 may recognize the speed of another mobile object detected by the radar device using, for example, a Doppler shift or the like.

The physical object recognizer 362 recognizes a marking for dividing the road on which the vehicle 300 is traveling. For example, the physical object recognizer 362 recognizes the marking by, for example, analyzing the image captured by the external camera of the external world detection device 302. For the recognition of the marking, an output such as a radar device, a LIDAR sensor, or a sensor fusion device may be used as an auxiliary.

The physical object recognizer 362 may collate the position information of the vehicle 300 from the positioning device 310 with the map information 352 to recognize whether the vehicle 300 is traveling on the road (whether or not the vehicle 300 deviates from the road).

The controller 364 controls an overall configuration of the vehicle 300. For example, the controller 364 outputs information for providing a notification from the HMI 314 to the occupant on the basis of the information recognized by the physical object recognizer 362 or causes the external notification device 340 to output the information. The controller 364 causes the communication device 312 to transmit vehicle data including information acquired by the external world detection device 302, a surrounding situation recognized by the physical object recognizer 362, position information of the vehicle 300 positioned by the positioning device 310, and a date and time information (an acquisition date and time, a recognition date and time, and a positioning date and time) to the area monitoring server 400. On the basis of the information provided from the area monitoring server 400, the controller 364 causes the HMI 314 to output information, causes the external notification device 340 to output information, or causes the drive device 330 to execute travel control.

[Area Monitoring Server]

Figure 6:
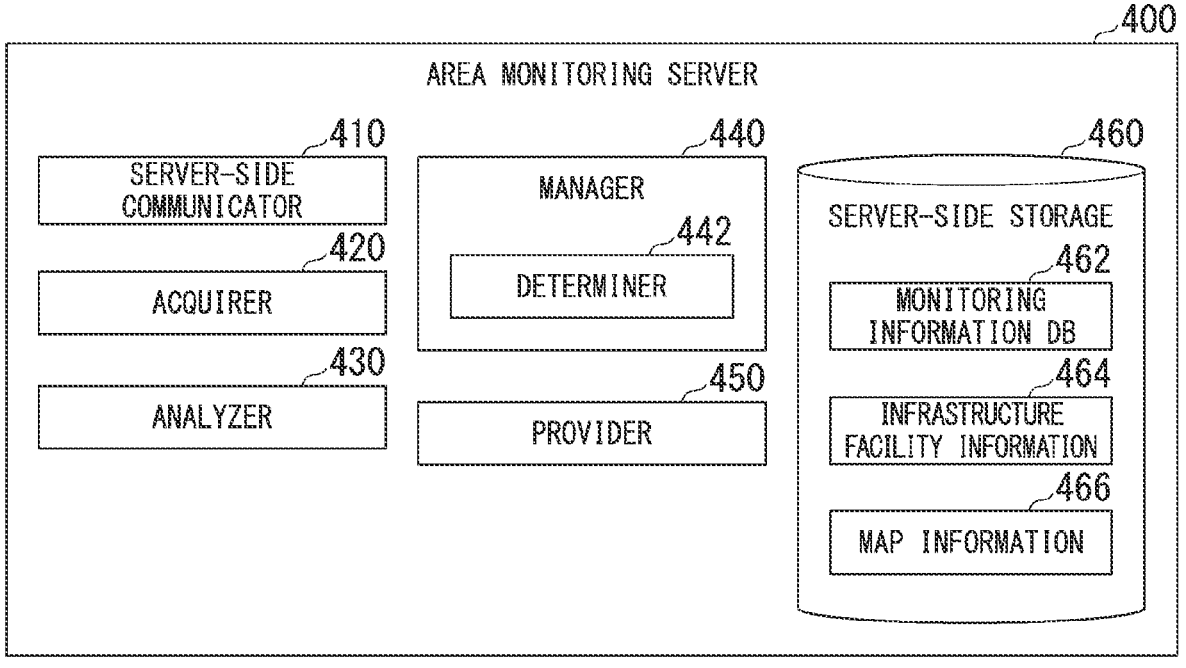
FIG. 6 is a diagram showing an example of a configuration of an area monitoring server.

FIG. 6 is a diagram showing an example of a configuration of the area monitoring server 400. The area monitoring server 400 includes, for example, a server-side communicator 410, an acquirer 420, an analyzer 430, a manager 440, a provider 450, and a server-side storage 460. The acquirer

420, the analyzer 430, the manager 440, and the provider 450, for example, are implemented by a hardware processor such as a CPU executing the program (software). Also, some or all of these components may be implemented by hardware (including a circuit; circuitry) such as an LSI circuit, an ASIC, an FPGA, or a GPU or may be implemented by software and hardware in cooperation. The program may be pre-stored in the storage device or may be stored in a removable storage medium (a non-transitory storage medium) such as a DVD or a CD-ROM and installed in the storage device when the storage medium is mounted in a drive device.

The server-side storage 460 may be implemented by the above-described various types of storage devices, a solid-state drive (SSD), an electrically erasable programmable read-only memory (EEPROM), a ROM, a random-access memory (RAM), or the like. The server-side storage 460 stores, for example, a monitoring information database (DB) 462, infrastructure facility information 464, map information 466, programs, other various types of information, and the like.

The monitoring information DB 462 stores content such as sensor data transmitted from the sensor device 100 and vehicle data transmitted from the vehicle 300. In the infrastructure facility information 464, for example, an installation position, an installation orientation (an angle of view (an imaging range) or a display direction) and type information are associated with a sensor ID of the sensor device 100 or identification information (an information providing device ID) of the information providing device 200. For example, in the case of the sensor device 100, the type information includes identification information for identifying a stereo camera, a monocular camera, a fisheye camera, an infrared camera, a TOF camera, a radar device, a LIDAR sensor, a microphone, and the like. In the case of the information providing device 200, the type information includes, for example, identification information for identifying a display, a speaker, and a light emitter. The map information 466 includes information similar to the map information 352. The map information 466 may be updated at any time by the server-side communicator 410 communicating with an external device.

The server-side communicator 410 communicates with the sensor device 100, the information providing device 200, the vehicle 300, and other external devices via the network NW.

The acquirer 420 acquires information from the sensor device 100, the vehicle 300, and other external devices. For example, the acquirer 420 acquires the sensor data from the sensor device 100 or the vehicle data from the vehicle 300, and stores the acquired data in a monitoring information DB 472.

The analyzer 430 analyzes sensor data and vehicle data acquired by the acquirer 420. For example, the analyzer 430 analyzes image data when the sensor data or the vehicle data includes the image data. For example, the analyzer 430 recognizes a surrounding situation of the sensor device 100 by converting the image data into coordinates of an overhead view coordinate system and performing an image analysis process in a well-known method (a binarization process, a contour extraction process, an image enhancement process, a feature-quantity extraction process, a pattern matching process, or the like) on the basis of the coordinates after the conversion. The analyzer 430 may perform the above-described image analysis process without performing coordinate conversion.

For example, the analyzer 430 identifies a physical object included in the image data on the basis of a matching result (a matching degree) between feature information obtained by analyzing the image data and feature information predetermined for each physical object. The matching degree may be derived, for example, according to the number of matching elements among a plurality of feature elements included in the feature information and may be derived according to a degree of similarity of each feature element or the entire feature information. The matching degree may be derived, for example, on the basis of a sum of differences for each element. The matching degree may be derived from two items of information to be compared using functions based on artificial intelligence (AI) such as machine learning (a neural network) and deep learning or may be derived using other methods.

The analyzer 430 may recognize a position, type, speed, and the like of a physical object located in the monitoring target area included in the image data. Examples of the physical object include a mobile object such as the vehicle 300, a pedestrian, or a bicycle. The physical object may include a road structure or the like. Road structures include, for example, a road sign, a traffic signal, a curb, a median, a guardrail, a fence, a wall, a railroad crossing, a pedestrian crossing drawn on the road surface, a stop line, and the like. The physical object may include an obstacle that obstructs (or is likely to obstruct) the traveling of the vehicle 300.

The analyzer 430 recognizes a position (a relative position) of the mobile object located in the monitoring target area or recognizes a state of the mobile object such as a speed, acceleration, or movement direction using time-series image data. The position of the physical object is recognized, for example, as the position of an absolute coordinate system with the origin point of the representative point of the mobile object (the center of gravity, the center of a drive axis, or the like). The "state" of the physical object may include, for example, acceleration or jerks of the mobile object, or an "action state" (for example, whether or not it is passing or attempting to cross a pedestrian crossing). The analyzer 430 may recognize a physical object in a process similar to the physical object recognition process performed by the physical object recognizer 362.

The analyzer 430 may analyze feature information such as a shape for identifying a mobile object included in the monitoring target area. The feature information may include a pattern (including symbols, numbers, and the like visible from the outside), a color, and the like in addition to the shape. The analyzer 430 may measure a travel period of time of the mobile object in a prescribed segment.

The analyzer 430 may analyze a difference between a position of the road included in the image data and a position of the road included in reference image data (a reference image) obtained by performing an imaging process in advance by the same sensor device 100. The reference image is an image taken at a correct position, direction, and angle of view (an imaging range) using the same sensor device 100. For example, a degree of deviation between the road situation based on the image data and the road situation based on a predetermined reference image is derived. The degree of deviation is an index value indicating a magnitude of the deviation and the degree increases as the deviation increases. For example, the analyzer 430 binarizes the captured image data and the reference image data and analyzes the degree of deviation from an amount of deviation in a distance or direction of a road marking or the like obtained from a binarization result.

The analyzer 430 may extract an image area used as an analysis target among all image areas of the image data on the basis of a season, weather, or time period in which the image data is acquired and analyze the amount of deviation using an image of an extracted area (an extracted image). Thereby, it is possible to suppress the misrecognition of a physical object included in the image by moving the shadow by a building, tree, or the like around the monitoring target area.

When a mobile object is moving outside of a sensor range of a plurality of sensor devices in the monitoring target area, the analyzer 430 may monitor the situation of the monitoring target area using vehicle data obtained by sensors (external world detection devices 302) mounted in other mobile objects. The analyzer 430 may recognize information of at least one item from information about the movement of the mobile object from the sensor data and a reflection intensity corresponding to an attribute of the mobile object. The information about the movement of the mobile object, for example, includes various types of information that change with movement (in which an amount of movement can be derived) such as a deviation in the position of the mobile object and a speed distribution. The deviation in the position of the mobile object is, for example, a deviation in the position in a horizontal direction (a road width direction) for an extension direction (a longitudinal direction) of the road. The deviation includes information such as proximity to the right than the center of the lane and information such as an amount of lateral position change in a prescribed period of time. The speed distribution is a speed pattern of the time series of the mobile object (for example, gradually decelerating or accelerating, or traveling at a constant speed). The attribute of the mobile object is, for example, a type of vehicle, pedestrian, bicycle, or the like.

The manager 440 manages a situation of the monitoring target area on the basis of an analysis result of the analyzer 430 and the like. For example, the manager 440 manages whether or not the vehicle 300 traveling on the road included in the monitoring target area tends to deviate from the road, whether or not the vehicle 300 is slipping, whether or not there is a possibility of contact with other physical objects, and the like. When a difference between a travel period of time of a prescribed segment of the vehicle 300 measured by the analyzer 430 and a predetermined standard travel period of time is greater than or equal to a threshold value, the manager 440 may determine that there is an abnormality in the vehicle 300 (for example, a poor physical condition of the occupant, a failure of the vehicle) or an abnormality in the monitoring target area (for example, road surface freezing).

The manager 440 may include, for example, a determiner 442. The determiner 442 determines whether or not mobile objects detected by the plurality of sensor devices 100 are the same physical object on the basis of detection results of the plurality of sensor devices 100 installed in the vicinity of the monitoring target area. When it is determined that the mobile objects are the same physical object, the manager 440 tracks the behavior of the mobile object by integrating the analysis results of the sensors and the manager 440 tracks the behavior of the mobile object individually when it is determined that the mobile objects are not the same physical object. The determiner 442 may determine whether or not the degree of deviation from the reference image analyzed by the analyzer 430 is greater than or equal to the threshold value. When it is determined that the degree of deviation is greater than or equal to the threshold value, the manager 440 determines that maintenance of at least one of a peripheral monitoring area and the sensor device 100 is necessary. For example, the manager 440 determines that maintenance of the sensor device 100 is necessary when a difference between the position of the road included in the image captured by the sensor device 100 and the position of the road included in the reference image is greater than or equal to a threshold value.

The provider 450 provides information to a mobile object (a traffic participant such as the vehicle 300 or a pedestrian) moving in the monitoring target area via the vehicle 300 traveling in the monitoring target area, the sensor device 100 installed near the area, and the information providing device 200. The information provided in this case includes, for example, an action instruction for the mobile object (for example, deceleration, stop, or the like). The provider 450 may provide information to a manager (for example, a maintenance staff member) or the like who manages the monitoring target area. In this case, the provided information includes maintenance locations and maintenance content (for example, an adjustment of the installation position of the sensor device or cleaning of the monitoring target area).

[Specific Example of Area Monitoring]

Next, specific examples of an area monitoring process of the area monitoring system 1 will be described separately as several examples.

First Monitoring Example

Figure 7:
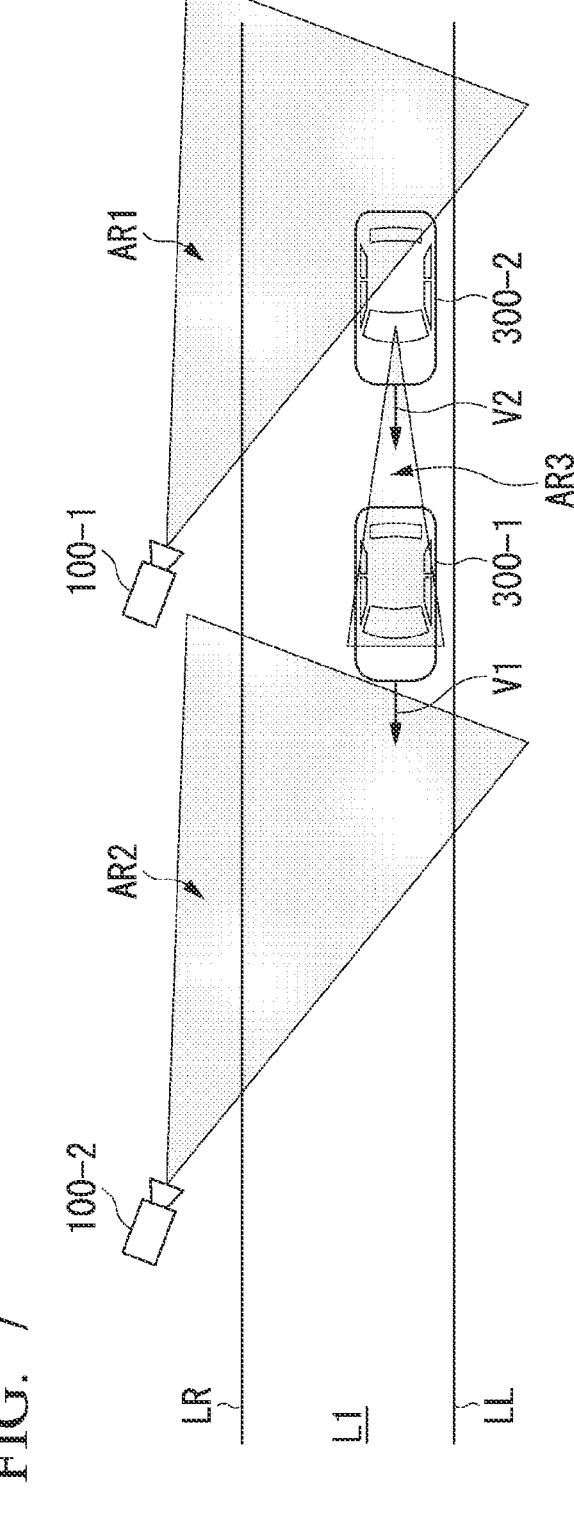
FIG. 7 is a diagram for describing a first monitoring example.

FIG. 7 is a diagram for describing a first monitoring example. The first monitoring example includes, for example, integrating information obtained from a plurality of sensor devices 100 installed on a road (an example of a monitoring target area) to comprehensively monitor a situation on a monitoring target road. In the example of FIG. 7, vehicles 300-1 and 300-2 traveling in a lane L1 defined by road markings LR and LL and sensor devices 100-1 and 100-2 installed near the lane L1 are shown. The sensor device 100-1 is an example of a "first sensor device," and the sensor device 100-2 is an example of a "second sensor device." It is assumed that the vehicle 300-1 is traveling at a speed V1 in the extension direction of lane L1 and the vehicle 300-2 is traveling behind the vehicle 300-1 at a speed V2 in a direction identical to that of the vehicle 300-1. The sensor devices 100-1 and 100-2 are installed at prescribed intervals and have fixed angles of view (imaging ranges) AR1 and AR2, respectively, to image an area including at least a part of the road (the lane L1). Sensor data including the captured camera image is transmitted to the area monitoring server 400 through the communicator 110. The installation positions, directions, and angles of view of the sensor devices 100-1 and 100-2 (information about a reference image) are registered in the infrastructure facility information 464 in advance.

The acquirer 420 of the area monitoring server 400 acquires sensor data transmitted from the sensor devices 100-1 and 100-2. The acquired sensor data may be stored in the monitoring information DB 462. The analyzer 430 analyzes the sensor data and recognizes the positions of the vehicles 300-1 and 300-2, the positions of the road markings LR and LL, and the like. The analyzer 430 analyzes speeds of the vehicles 300-1 and 300-2 from an amount of movement (an amount of change in position) in a prescribed period of time obtained from time-series sensor data. The analyzer 430 identifies vehicles included in sensor data acquired from the plurality of sensor devices 100 on the basis of a matching degree of feature information such as a shape of the vehicle 300 (for example, a roof portion of the vehicle 300). For example, the analyzer 430 identifies a vehicle having the matching degree greater than or equal to a threshold value as the same vehicle (the same physical object), assigns common identification information to the vehicle, and assigns other different identification information to a vehicle whose matching degree is less than the threshold value. Thereby, the manager 440 can manage a movement situation for each vehicle on the basis of the assigned identification information. The analyzer 430 may perform a similar analysis process on mobile objects other than the vehicle 300 located in the monitoring target area.

The manager 440 tracks a travel situation of the vehicle 300 on the basis of an analysis result and manages whether or not the vehicles 300-1 and 300-2 tend to depart from the lane L1 or manages whether or not the behavior of the vehicles 300-1 and 300-2 is abnormal due to slips or the like. For example, the determiner 442 of the manager 440 acquires a movement speed and a movement direction of the vehicle 300 between prescribed points according to an analysis result and determines that the vehicle 300 tends to depart from the lane L1 when it is determined that the vehicle 300 is likely to step over the road markings LR and LL within a prescribed period of time from positional relationships between the acquired movement speed or the acquired movement direction and the road markings LR and LL.

The manager 440 determines that the vehicle 300 is slipping when an amount of change in an angle formed by the extension direction of the lane L1 (the road) and the travel direction of the vehicle 300 in a prescribed period of time (a rate of change in the yaw angle (a yaw rate (an angular speed)) for the travel direction within a prescribed period of time) is greater than or equal to a threshold value.

Here, the plurality of sensor devices 100 installed in the monitoring target area are continuously installed at intervals so that sensor ranges (for example, angles of view of the camera devices) overlap and therefore the same vehicle or the same person can be tracked more accurately. However, in practice, due to the influence of the road shape, facility cost, or the like, the sensor ranges may be installed without overlapping, in which case a blind spot occurs in the monitoring target area. Therefore, in the first monitoring example, in a situation where the sensor ranges do not overlap, when it is estimated that a passing vehicle is outside of the sensor range of one of the plurality of sensor devices 100 and heading into the sensor range of another sensor device 100, information of a segment where the sensor ranges do not overlap is acquired from a detection result of the external world detection device 302 mounted in the vehicle 300.

For example, when the travel situation of the vehicle 300-1 shown in FIG. 7 is monitored, the behavior of the vehicle 300-1 outside of the sensor ranges (the angles of view AR1 and AR2) of the sensor devices 100-1 and 100-2 is tracked using image data obtained in the imaging process of the external world detection device 302 mounted in the vehicle 300-2. Thereby, lane departure, slip, and the like of the vehicle 300-1 in the blind spot area not included in the angles of view AR1 and AR2 can be recognized.

In the first monitoring example, even if the sensor ranges of the plurality of sensor devices 100 overlap, a tracking process may be performed using a result of analyzing image data obtained in an imaging process of the external world detection device 302 mounted in the vehicle 300-2 similarly even in a case where the blind spot area has occurred by performing an analysis process using an image extracted from the entire image area of the image data on the basis of a season, weather, time period, or the like.

Thus, according to the first monitoring example, the blind spot area can be reduced by interpolating the blind spot of the sensor data from the sensor device 100 using the vehicle data acquired from the vehicle 300-2 and a situation occurring in the monitoring target area can be monitored without omission.

Second Monitoring Example

Figure 8:
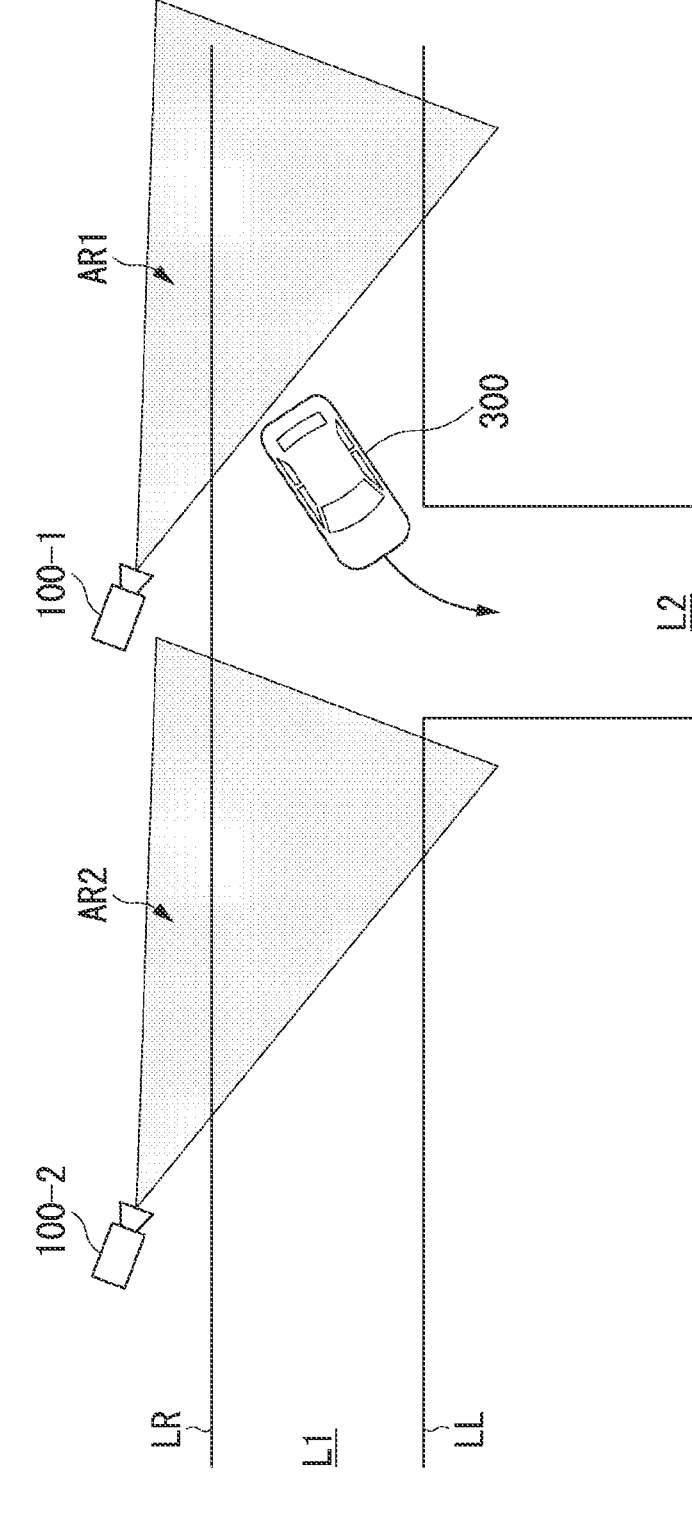
FIG. 8 is a diagram for describing a second monitoring example.

FIG. 8 is a diagram for describing a second monitoring example. The second monitoring example includes, for example, monitoring the behavior of the vehicle 300 on the basis of a result of analyzing images captured by the plurality of sensor devices 100 installed in the monitoring target area and a road shape included in the monitoring target area. In the example of FIG. 8, a road of a T-junction in which the lane L2 is connected perpendicular to the lane L1 is shown.

In the second monitoring example, the sensor devices 100-1 and 100-2 are installed at positions where the sensor ranges (angles of view AR1 and AR2) do not overlap. The manager 440 tracks the travel situation of the vehicle 300-1 on the basis of the sensor devices 100-1 and 100-2. Here, when it is estimated that the vehicle 300 located at the angle of view AR1 of the sensor device 100-1 moves outside of the angle of view AR1 and heads in the direction of the angle of view AR2 of the sensor device 100-2, the manager 440 predicts that an abnormality is likely to have occurred in the vehicle 300 or that the vehicle 300 is stopped when the vehicle 300 is not recognized in the sensor data captured by the sensor device 100-2 within a prescribed period of time. The manager 440 acquires a road shape around the installation position of the sensor device 100 with reference to the map information 466 on the basis of the position information of the sensor devices 100-1 and 100-2 and predicts that the vehicle 300 is likely to move to a lane L2 when the lane (branching lane) L2 connected to the lane L1 is located between the sensor ranges of the sensor devices 100-1 and 100-2. The lane L2 is an example of a "branching road."

The manager 440 may predict that an abnormality such as an accident is likely to occur in a segment between the angles of view AR1 and AR2 when the vehicle 300 is not recognized in the sensor data obtained in the imaging process of the sensor device 100-2 within a prescribed period of time and when other vehicles are not recognized (or the number of passing vehicles is less than a threshold value). According to the first and second monitoring examples, the monitoring target area can be more appropriately monitored using a plurality of sensor devices 100 installed on the road.

Third Monitoring Example

Figure 9:
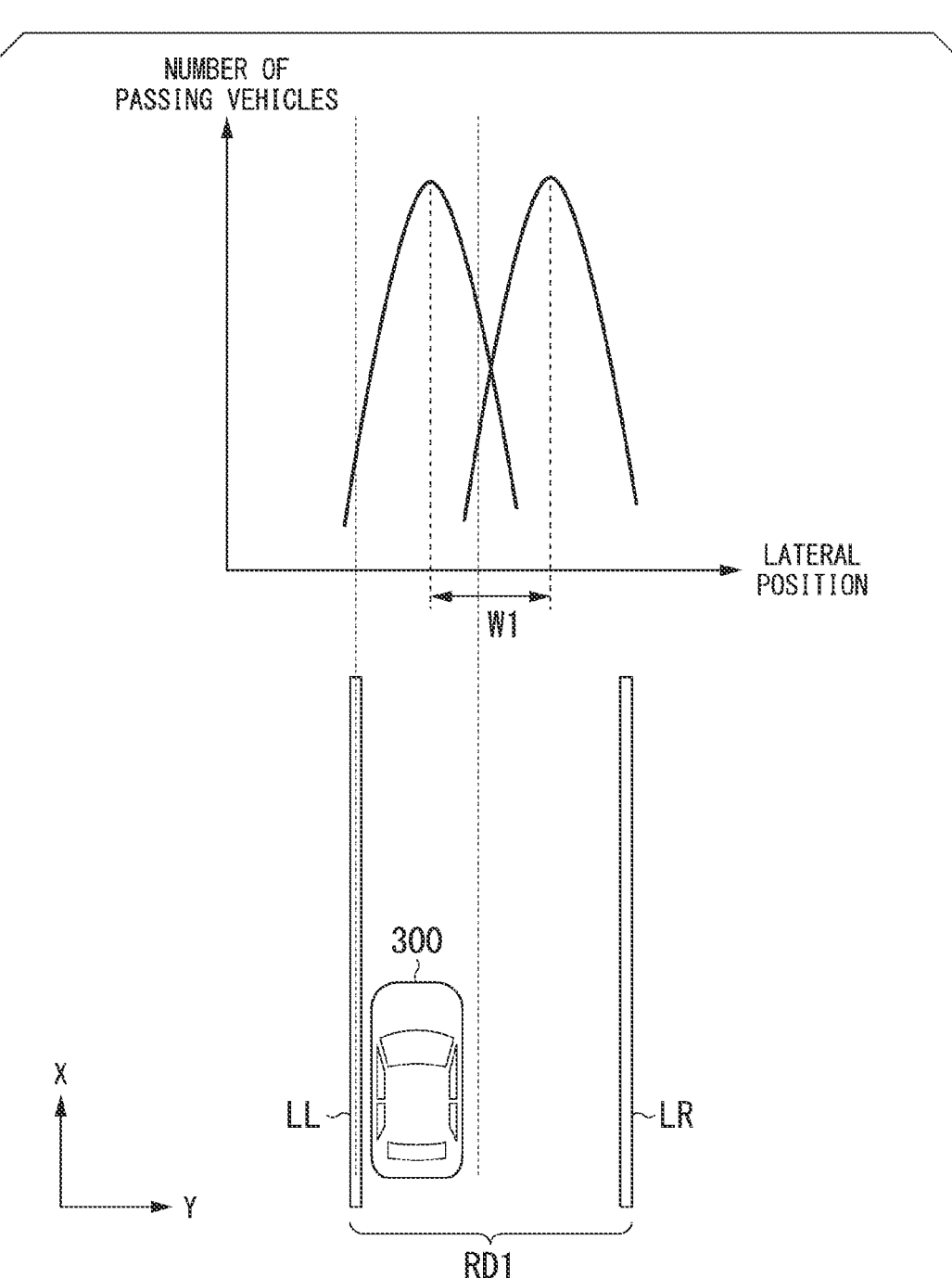
FIG. 9 is a diagram for describing a third monitoring example.

FIG. 9 is a diagram for describing a third monitoring example. The third monitoring example includes monitoring an installation situation of the sensor device 100 installed near the monitoring target area. In the example of FIG. 9, a vehicle 300 traveling in an X-axis direction in FIG. 9 on a road RD1 where oncoming vehicles can pass is shown. For example, the direction and sensor range of the sensor device 100 may deviate from the standard due to an influence of an earthquake, wind, rain, or the like. If the deviation is not detected at an early stage, there is a possibility that it will be impossible to recognize the physical object or that accurate area monitoring will be impossible due to erroneous recognition or the like. Therefore, in the third monitoring example, the manager 440 aggregates a position (a travel road position) where the vehicle 300 traveling in the same direction (for example, the X-axis direction) passes on the road RD1 in the monitoring target area and monitors an installation situation of the sensor device 100 on the basis of an aggregation result.

For example, the manager 440 acquires a difference (a pixel deviation amount) W1 between an actually recognized traveling path position obtained as an aggregation result and a predetermined travel path position for the sensor device 100 installed on the road and determines that there is an abnormality in the state (the installation state) of the sensor device 100 is abnormal when the acquired difference W1 is greater than or equal to a threshold value.

Although the determination is made on the basis of a deviation amount W1 in a lateral direction of the road RD1 in the example of FIG. 9, a deviation amount of each of a longitudinal direction, an oblique direction, a rotation direction, and the like of the road RD1 may be acquired instead of (or in addition to) this and it may be determined whether or not there is an abnormality in the state of the sensor device 100 on the basis of an acquired multidimensional deviation amount.

When it is determined that the total number of pixels recognized as a road area from the image data is less than a threshold value, the manager 440 may predict that fallen leaves, other obstacles, and the like are likely to be located on the road.

When it is predicted that shadows will appear on the road within the monitoring target area due to a direction of solar radiation, a surrounding environment (for example, trees, buildings, and the like), and external lights installed in the monitoring target area, the total number of pixels recognized as those of a road is likely to change. Therefore, the manager 440 may adjust the total number of pixels for each time period, set an area in which a recognition process is not performed within the image in consideration of the position and range of the shadow in the time period, and monitor a situation of the road based on the total number of pixels of the road using an image outside of the area. The manager 440 may adjust the time period for each season and may determine whether or not to perform the above-described process according to the presence or absence of a shadow due to weather.

In the third monitoring example, the manager 440 may determine whether or not maintenance regarding at least one of the monitoring target area and the sensor device 100 is necessary on the basis of the monitoring result. For example, the maintenance includes, for example, the maintenance of a road included in the monitoring target area and the maintenance of the sensor device 100 installed in the monitoring target area. The maintenance of the road includes, for example, cleaning up fallen leaves and garbage on roads, removing obstacles, draining puddles, and the like. The maintenance of the sensor device 100 includes, for example, correcting (readjusting) a deviation in the installation direction of the sensor device 100, repairing or replacing the device itself, and the like. Here, specific examples in which the maintenance of the road is monitored and the maintenance of the sensor device 100 is monitored will be described below.

<Monitoring for Maintenance of Road>

In the case of monitoring for the maintenance of the road, the manager 440 determines that maintenance of the road included in the camera image is necessary, for example, when a first deviation amount between the reference image and the camera image is greater than or equal to a prescribed amount and causes the provider 450 to provide information for promoting maintenance. The first deviation amount is, for example, a difference value in the number of pixels (the number of bits) when the total number of pixels in a part recognized as a road of the camera image is compared with that in the same part of the reference image. For example, when a camera image of a road where fallen leaves or the like are accumulated on the road surface is binarized, an area where fallen leaves are accumulated is not recognized as a road and the number of pixels in the part recognized as the road in the camera image is likely to be smaller than that in the reference image. When there is a puddle on or around the road or the like, the number of pixels is likely to be larger than that of the reference image according to an imaging environment. Therefore, the manager 440 determines that the maintenance of the road is necessary when a degree of deviation based on the first deviation amount is greater than or equal to a threshold value (i.e., when the deviation is large).

<Monitoring for Maintenance of Sensor Device 100>

In the case of monitoring for the maintenance of the sensor device 100 (for example, the camera device), for example, the manager 440 causes the provider 450 to provide information for promoting the maintenance of the sensor device 100 when a difference between the position of the road included in the reference image and the position of the road included in the camera image is greater than or equal to a threshold value. For example, when a second deviation amount between the reference image and the camera image is greater than or equal to a prescribed amount, the manager 440 determines that it is necessary to maintain the camera device capturing the camera image, and causes the provider 450 to provide information for promoting the maintenance. The second deviation amount is a difference value between an output result obtained by multiplying parts recognized (set) as those of the road in the binary reference image and the binary camera image and outputting multiplication results and the number of pixels (the number of bits) recognized as those of the road in the binary reference image. The term "multiplying the parts by each other and outputting the multiplication results" indicates, for example, setting portions (pixels) recognized as part of the road in each binary image to "1," setting other portions (pixels) to "0," multiplying values (1 or 0) of pixels at the same position in the images by each other, and outputting a sum obtained by summing multiplication results for all pixels. The manager 440 determines that maintenance of the sensor device 100 is necessary when the degree of deviation based on the second deviation amount is greater than or equal to the threshold value (i.e., when the deviation is large). The first deviation amount and the second deviation amount described above are analyzed, for example, by the analyzer 430.

Thus, according to the third monitoring example, an abnormality in the position of the sensor device 100 and an abnormality in the road can be detected at an early stage, and a maintenance staff member or the like can be notified of the abnormality.

Fourth Monitoring Example

Next, a fourth monitoring example will be described. The fourth monitoring example includes monitoring the monitoring target area by combining sensor data obtained from a plurality of sensor devices having different types (characteristics). FIG. 10 is a diagram showing an example of characteristic information for the sensor type. In the example of FIG. 10, for each sensor type, evaluation results for position accuracy, speed accuracy, a detection range, situation ascertainment, and environmental resistance are shown as the characteristic information. In the example of FIG. 10, it is assumed that the mark "⊚" indicates the highest evaluation, and the marks "O" and "A" indicate sequentially lower evaluations. In FIG. 10, evaluation results may be included for each sensor type in terms of cost.

For example, in a segment having a prescribed distance such as a road, it is necessary to detect a physical object within the monitoring target area using a plurality of sensors. Because the plurality of sensor devices may not have the same characteristics (performance and functions), an appropriate combination according to the monitoring target area is necessary. Thus, in the fourth monitoring example, on the basis of the characteristics of each sensor type determined in advance as shown in FIG. 10, the types and number of sensors optimal for the monitoring target area are installed in consideration of characteristics of each sensor and the situation of the monitoring target area is monitored. For example, a stereo camera, a TOF camera, a LIDAR sensor, or the like is used in an area where a position of a physical object is to be more accurately monitored and a radar device is installed in an area where the speed of the physical object is more accurately monitored. A radio wave sensor may be installed in a segment where the curvature of the road included in the monitoring target area is less than a threshold value and an optical sensor may be installed in a segment where the curvature of the road is greater than or equal to the threshold value. The manager 440 manages the types (combinations) and number of sensor devices 100 installed in the vicinity of the monitoring target area on the basis of the characteristic information, road shape, and the like as shown in FIG. 10. The manager 440 may adjust the types and number of sensors to be installed in accordance with the cost of the sensor device 100.

For example, when a radio wave sensor and an optical sensor are installed in the monitoring target area, a mobile object (for example, the vehicle 300) is recognized by the optical sensor and then moves outside the sensor range, and the radio wave sensor is located at a movement destination, the determiner 442 determines whether or not physical objects detected by the sensors are the same physical object on the basis of at least one information item of information about the movement of the mobile object (a position deviation and a speed distribution) and the reflection intensity according to the attribute of the mobile object capable of being acquired from the sensor data. For example, the determiner 442 determines whether or not physical objects detected by the sensors are the same physical object by selecting at least one information item among the deviation in the position of the mobile object, the speed distribution, and the reflection intensity according to the sensor types of the first sensor device and the second sensor device.

The determiner 442 may determine whether or not the detected physical objects are the same physical object using similar information even if the mobile object moves outside the sensor range after the mobile object is recognized by the radio wave sensor and the optical sensor is located at the movement destination.

Further, the manager 440 may issue an action instruction to the vehicle 300 when the above-described mobile object is a vehicle 300 and a physical object (for example, another vehicle, a pedestrian, or a bicycle) is located in the vicinity of the vehicle 300 (in other words, when there is a physical object that is likely to come into contact with the vehicle 300). Action instructions include, for example, instructions regarding one or both of speed control (deceleration and stop) and steering control.

The manager 440 may differentiate the content of the action instruction to the vehicle 300 according to, for example, a degree of influence on the contact of a physical object approaching the vehicle 300. For example, if the approaching physical object is a traffic participant (a traffic participant with a high degree of influence on the body such as injury) having little resistance to the vehicle 300 such as a person or a bicycle, action content is strengthened (a large-action instruction is issued) as compared with the case where the approaching physical object is another vehicle. Specifically, when a person is approaching the vehicle 300 (when the person is within a prescribed distance), a stronger deceleration instruction is issued than when the vehicle 300 approaches. Thereby, safety can be further improved.

When the information providing device 200 is set in the monitoring target area, the provider 450 causes the information providing device 200 to output an image or sound indicating the content of the action instruction under the control of the manager 440. Thereby, the occupant of the vehicle 300 can perform driving to avoid contact with a physical object according to the action instruction output from the information providing device 200. When a plurality of sensor devices 100 include a camera device (an image sensor), the manager 440 may acquire information about the attribute of a physical object approaching the vehicle 300 included in the camera image of the camera device and may control the provider 450 so that the acquired information is output to the information providing device 200. Thereby, because the information providing device 200 installed near the approaching physical object can cause the attributes of the approaching physical object (a person, a vehicle, a bicycle, or the like) as well as the action instruction to be displayed, it is possible to allow a target physical object associated with the action instruction to be accurately ascertained.

The provider 450 may output information for causing the vehicle 300 to execute one or both of the speed control and steering control according to content of the action instruction for the vehicle 300 to the vehicle 300 under the control of the manager 440. Thereby, travel control of the vehicle 300 can be executed without waiting for the driving operation of the occupant of the vehicle 300.

Thus, according to the fourth monitoring example, the situation can be more appropriately monitored using sensor data even if different types of sensor devices 100 are installed in the monitoring target area. According to the fourth monitoring example, because lower-cost sensor devices can be combined in accordance with monitoring content and the like, the facility cost can be reduced. Each of the first to fourth monitoring examples described above may include some or all of the other monitoring examples. [Information Provision]

Figure 11:
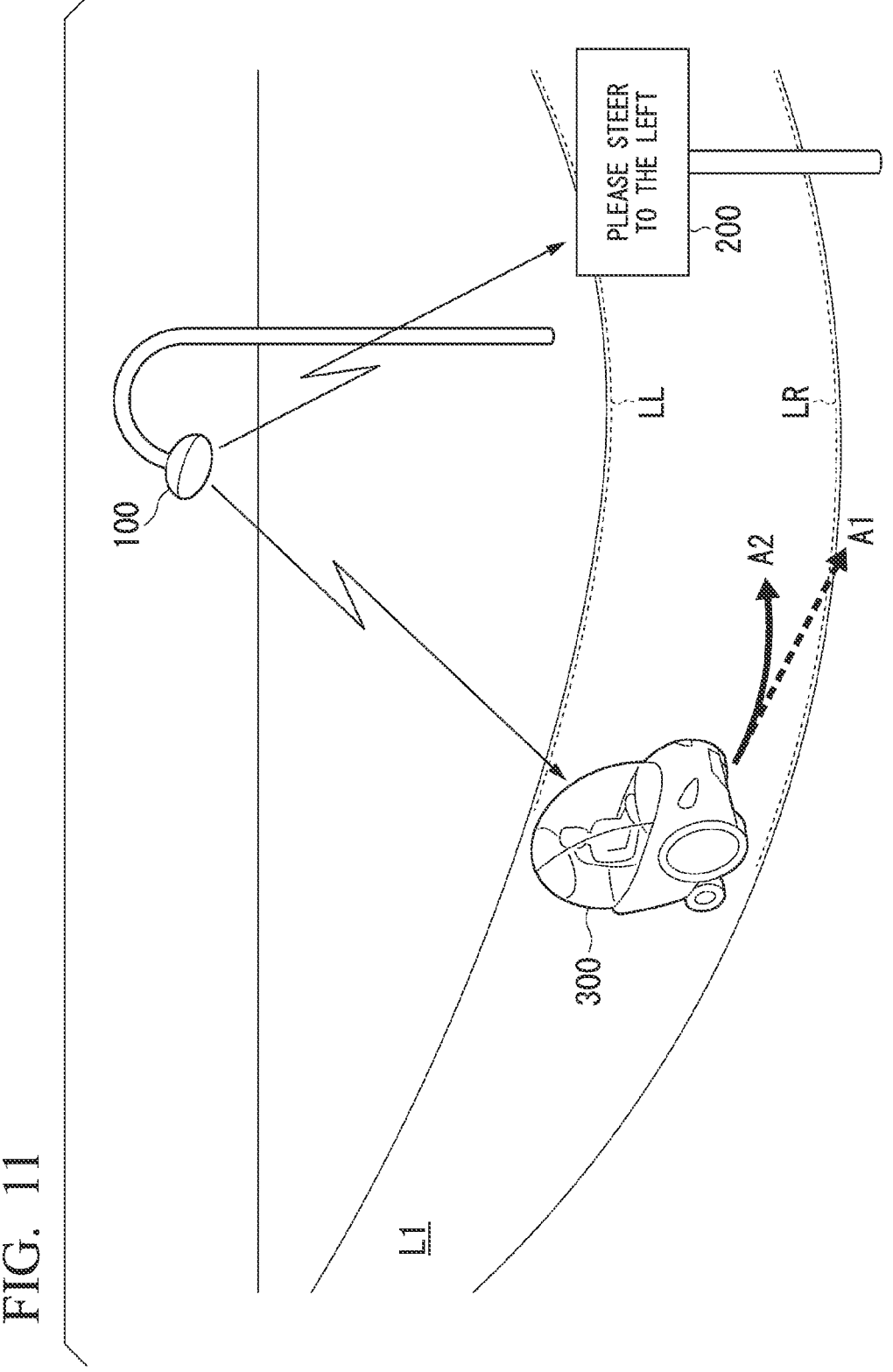
FIG. 11 is a diagram showing a first example of information provision.

Next, an example of information provision based on the monitoring result will be described with reference to the drawings. FIG. 11 is a diagram showing a first example of information provision. In the example of FIG. 11, for example, when it is determined that the vehicle 300 departs from a lane L1 on the basis of the first monitoring example, information is provided to the occupants of the vehicle 300 so that movement is possible in a non-deviation direction. In the example of FIG. 11, the sensor device 100 is installed on a curve path (a segment where the curvature is greater than a prescribed level) from which the vehicle is likely to depart. The information providing device 200 is installed near the lane L1.

The manager 440 tracks the traveling of the vehicle 300 on the basis of the sensor data obtained from the sensor device 100. Here, when it is determined that the travel direction of the vehicle 300 (an arrow A1 in FIG. 11) may depart from an area of the lane L1 (step over a road marking LR) on the basis of a tracking result, the provider 450 causes the information providing device 200 to display information (action instructions) for suppressing the departure. In the example of FIG. 11, text information such as "Please steer to the left" is displayed on the display 220 of the information providing device 200 installed at a position where the occupants of the vehicle 300 can see. The manager 440 manages which information providing device 200 displays this text information.

The provider 450 may transmit information (an action instruction) for causing the occupant of the vehicle 300 to execute the steering operation to the vehicle 300 via the sensor device 100 and cause the HMI 314 to display the information (the action instruction). Alternatively, the provider 450 may transmit control information for automatically performing steering control of the vehicle 300 to the vehicle 300 and cause the drive device 330 to execute a travel control process of steering the vehicle 300 to the left. Thereby, the vehicle 300 can be moved in a direction of an arrow A2 in FIG. 11.

When the manager 440 determines that the vehicle 300 is slipping, the provider 450 may cause the display 220 of the information providing device 200 to display caution information such as "road surface freezing caution" or may transmit information (the action instruction) for allowing the occupant of the vehicle 300 to execute a deceleration operation (or automated deceleration control) to the vehicle 300.

Although an example in which information from the area monitoring server 400 is transmitted to the information providing device 200 or the vehicle 300 via the sensor device 100 is shown in the example of FIG. 11, the information may be directly transmitted from the area monitoring server 400 to the information providing device 200 or the vehicle 300.

Figure 12:
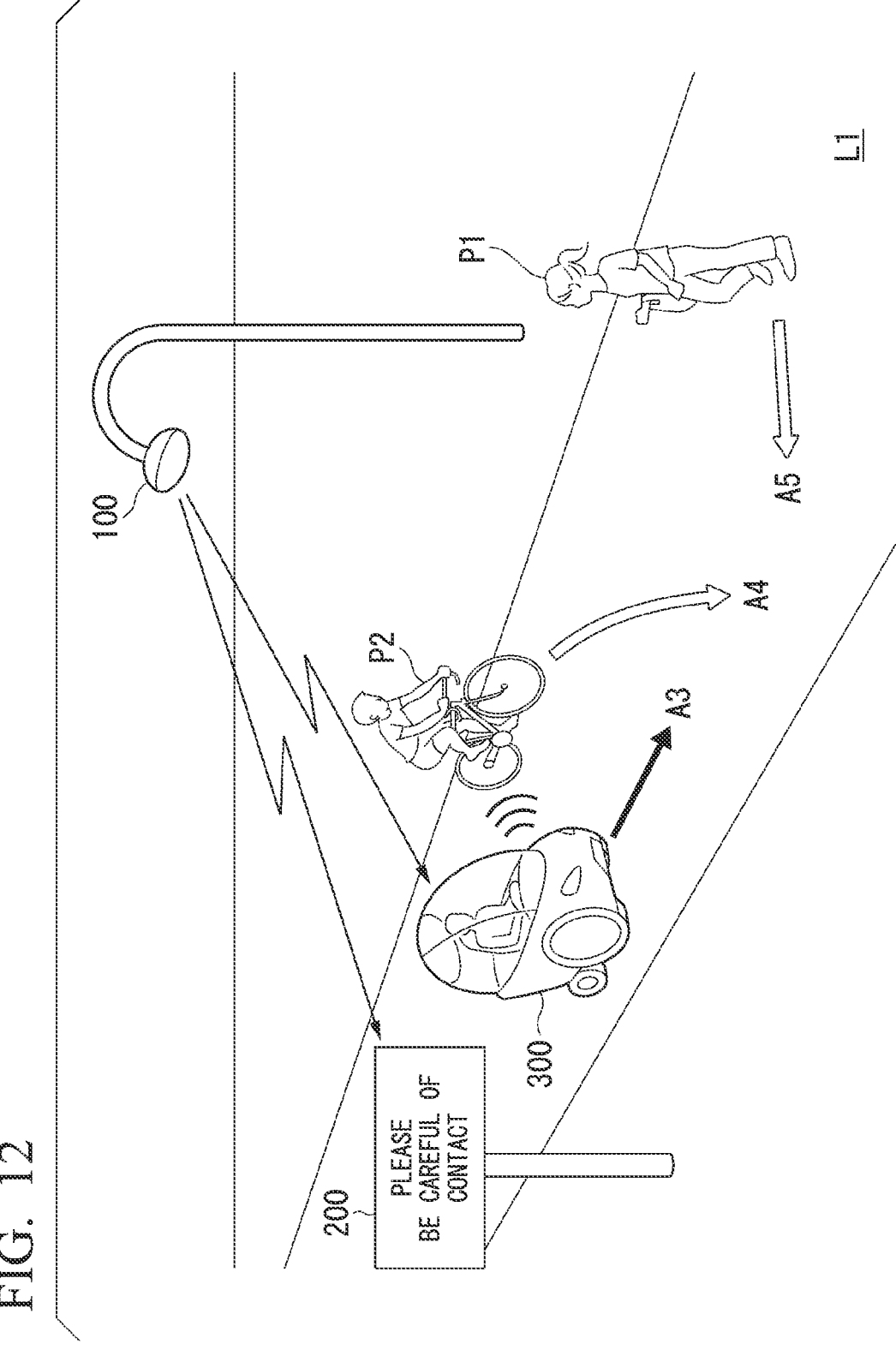
FIG. 12 is a diagram showing a second example of information provision.

FIG. 12 is a diagram showing a second example of information provision. In the example of FIG. 12, a notification is given to avoid contact between mobile objects moving in a lane L1. In the example of FIG. 12, a vehicle 300, a pedestrian P1, and a bicycle P2 moving in the lane L1 are shown. In the vicinity of the lane L1 shown in FIG. 12, the sensor device 100 configured to image an area including the lane L1 and the information providing device 200 are installed. Arrows A3, A4, and A5 shown in FIG. 12 indicate movement directions of the vehicle 300, the bicycle P2, and the pedestrian P1 acquired from the time-series sensor data.

The manager 440 of the area monitoring server 400 analyzes the sensor data detected by the sensor device 100, determines which of the vehicle 300, the pedestrian P1, and the bicycle P2 is likely to come into contact with another physical object from an analysis result, and provides information (an action instruction) for avoiding contact to the sensor device 100, the information providing device 200, the vehicle 300, and the like when it is determined that there is a possibility of contact.

For example, the provider 450 transmits provided information for displaying a text image such as "Please be careful of contact" from the display 220 of the information providing device 200 to the information providing device 200 via the network NW. Thereby, the occupant of the vehicle 300, the pedestrian P1, and the occupant of the bicycle P2 seeing text displayed on the display 220 of the information providing device 200 can avoid contact as soon as possible.

The provider 450 may transmit information to the vehicle 300 so that information similar to that displayed on the display 220 is displayed on the HMI 314 of the vehicle 300 or may transmit information for notifying that the pedestrian P1 or the bicycle P2 is approaching. The provider 450 may transmit control information for stopping the vehicle 300 to the vehicle 300 or may transmit instruction information for outputting a warning sound (horn) for notifying the pedestrian P1 and the occupant of the bicycle P2 that the vehicle 300 is approaching or the like from the external notification device 340 of the vehicle 300 to the vehicle 300. Thereby, more appropriate information can be provided in accordance with the situation of the physical object passing on the road (in the lane L1), and safety during passing the lane L1 can be further improved.

When information is provided in the third monitoring example, the manager 440 may provide information requesting maintenance (environmental maintenance) to a terminal device (not shown) of the maintenance staff member. In this case, the notification of a position of the sensor device 100 where an abnormality has occurred, a position of the monitoring target area, and a type of abnormality (for example, movement of the sensor device 100) may be provided. Thereby, the maintenance staff member can more specifically ascertain a place and content of maintenance and the like and can perform more appropriate work preparation and work.

Furthermore, when a light emitter is provided in the information providing device 200, the light emitter may be controlled so that it is in a light emitting state in accordance with the action instruction. For example, when it is determined that the vehicle 300 tends to depart from the lane L1 as shown in FIG. 11, the provider 450 causes the light emitter installed in the road marking LR to be turned on in addition to (or instead of) the above-described information provision. As shown in FIG. 12, when mobile objects are close to each other, the light emitter installed on the road surface is turned on. The provider 450 may switch between lighting and blinking or adjust the color and light amount (intensity) in accordance with a distance between the vehicle 300 and the road marking LR and a degree of proximity (a relative distance) between the mobile objects. Thereby, it is possible to allow mobile object to more appropriately ascertain a current situation.

[Processing Sequence]

Figure 13:
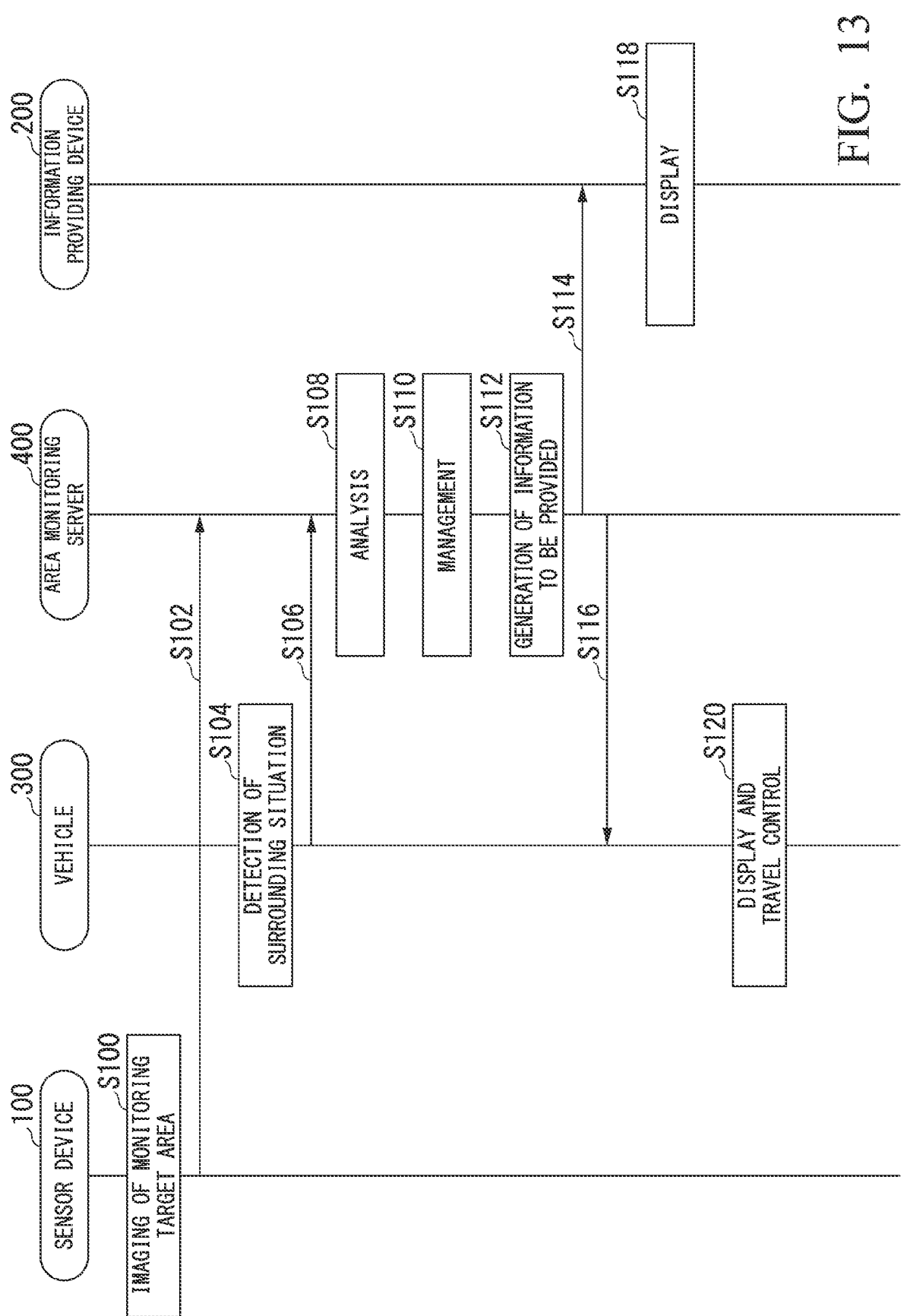
FIG. 13 is a sequence chart showing an example of a flow of a process executed by the area monitoring system of the embodiment.

FIG. 13 is a sequence chart showing an example of a flow of a process executed by the area monitoring system 1 of the embodiment. In the example of FIG. 13, a process using the sensor device 100, the vehicle 300, the area monitoring server 400, and the information providing device 200 will be described. In the example of FIG. 13, it is assumed that the sensor device 100 is a camera device, the vehicle 300 is a vehicle traveling in an angle of view (a monitoring target area) at which an imaging process of the sensor device 100 is performed, and the information providing device 200 is installed near the monitoring target area of the sensor device 100.

In the example of FIG. 13, the sensor device 100 images the monitoring target area (step S100) and transmits sensor data including a captured camera image to the area monitoring server 400 (step S102). The vehicle 300 detects a surrounding situation of the monitoring target area with the external world detection device 302 or the like (step S104) and transmits vehicle data including a detection result to the area monitoring server 400 (step S106).

The area monitoring server 400 receives the sensor data and the vehicle data and analyzes the image data and the like included in the received data (step S108) and manages the monitoring target area on the basis of analysis results and the like (step S110). Specifically, at least one of the first to fourth monitoring examples described above is executed. Subsequently, when the area monitoring server 400 determines that it is necessary to provide information to the monitoring target area, the area monitoring server 400 generates the provided information (step S112) and transmits the generated provided information to the information providing device 200 (step S114). The area monitoring server 400 transmits the generated provided information to the vehicle 300 (step S116).

The information providing device 200 receives the information transmitted from the area monitoring server 400 and causes the display 220 or the like to display an image corresponding to the received information (step S118). Instead of (or in addition to) displaying an image on the display 220, the information providing device 200 may cause a sound corresponding to the received information to be output from the speaker 230. The light emitter provided on the road may be turned on (or blinked) in a state corresponding to the received information.

The vehicle 300 receives the information transmitted from the area monitoring server 400 and causes the HMI 314 to display an image corresponding to the received information, or executes travel control (for example, speed control or steering control) corresponding to the received information (step S120). Instead of (or in addition to) the above-described control, the vehicle 300 may output a sound corresponding to the received information to the external notification device 340. Thereby, the process of the present sequence ends.

In the processing of step S112, the area monitoring server 400 may generate information to be provided to the maintenance staff member when maintenance work of the monitoring target area is required and transmit the generated information to the terminal device owned by the maintenance staff member.

Subsequently, the specific processing of steps S108 to S112 described above will be described using a flowchart.

<First Process>

Figure 14:
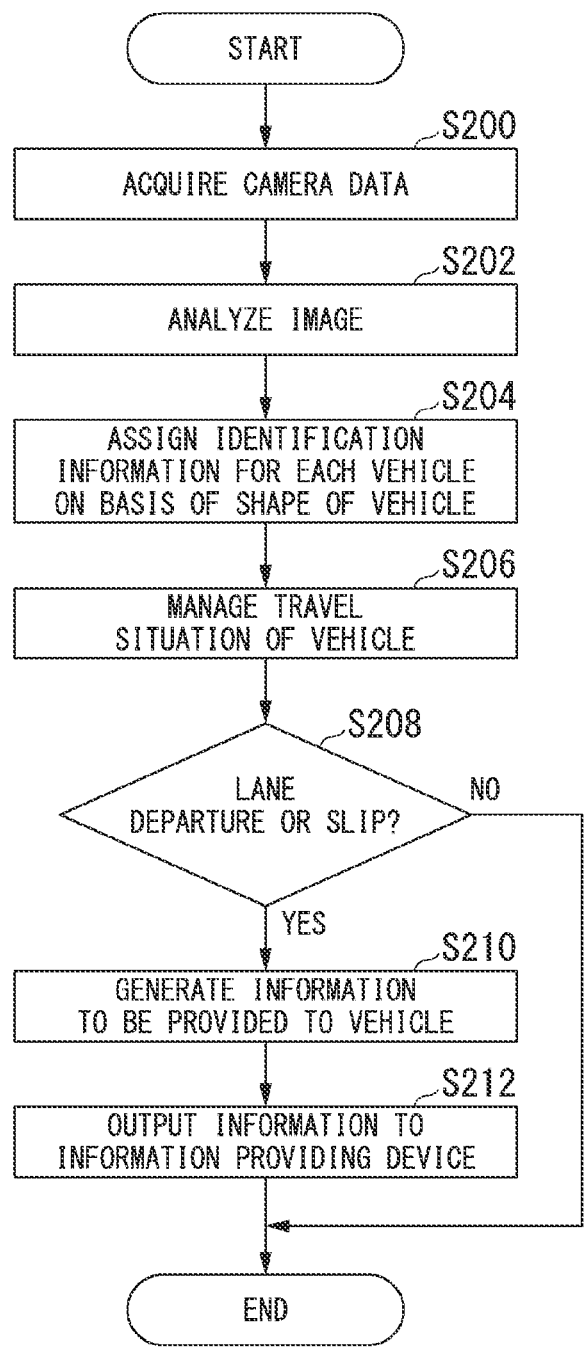
FIG. 14 is a flowchart showing an example of a first process.

FIG. 14 is a flowchart showing an example of a first process. In the example of FIG. 14, it is assumed that the sensor device 100 installed in the monitoring target area is a camera device and an example of a mobile object is the vehicle 300. The process shown in FIG. 14 may be iteratively executed at a prescribed interval or at a prescribed timing. It is assumed that these are also similar to those of a process shown in FIG. 15 to be described below (a second monitoring process).

In the example of FIG. 14, the acquirer 420 acquires camera data from the camera device (step S200). Subsequently, the analyzer 430 analyzes the acquired camera data (step S202). The manager 440 assigns identification information for each vehicle included in the camera data on the basis of a shape of the vehicle obtained as an analysis result (step S204) and manages a travel situation of the vehicle 300 in the monitoring target area (step S206).

Subsequently, the manager 440 determines whether or not the vehicle 300 has departed from a lane (a road) during traveling or whether the vehicle 300 is slipping (step S208). When it is determined that the vehicle has departed or is slipping, the provider 450 generates information to be provided to the vehicle 300 (step S210) and causes the generated information to be output to the information providing device 200 (step S212). In the processing of step S212, the information to be provided to the vehicle 300 may be transmitted to the vehicle 300. In this case, the information to be provided to the vehicle 300 includes information to be output from the HMI 314 (an image or sound) or information for performing steering control and speed control. Thereby, the process of the present flowchart ends. If it is determined that there is no lane departure and slip of the vehicle 300 in the processing of step S208, the process of the present flowchart also ends. In the above-described processing of step S208, it may be determined whether or not mobile objects moving in the monitoring target area included in the camera data are likely to come into contact with each other.

<Second Process>

Figure 15:
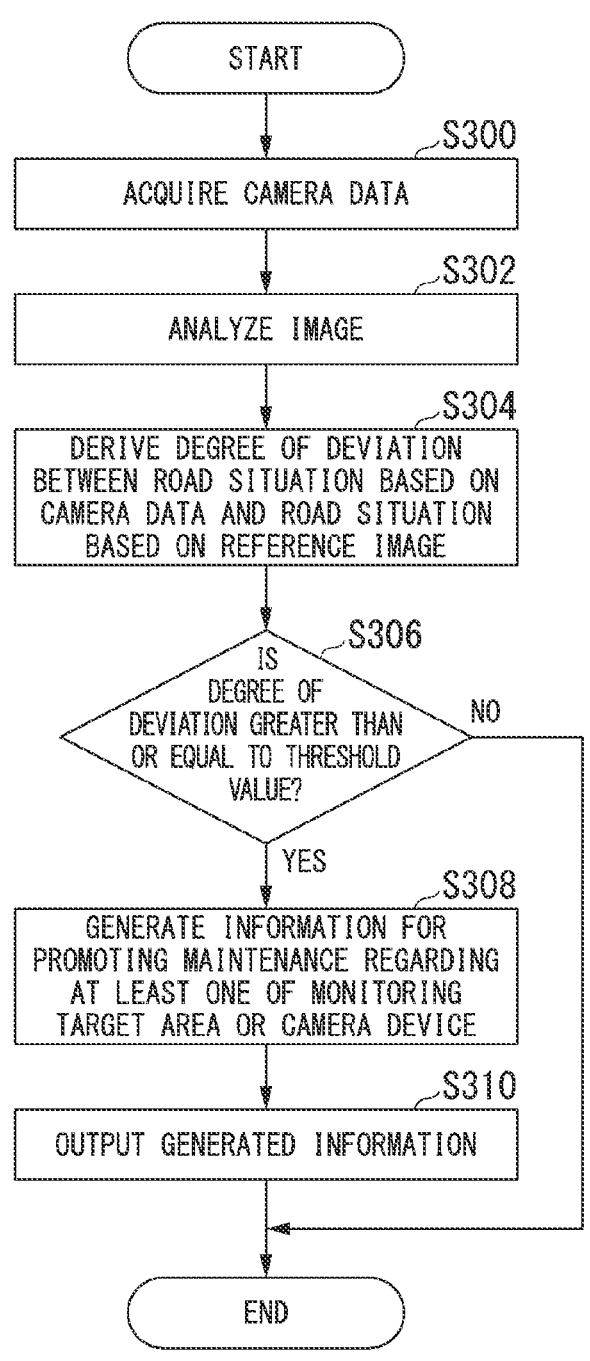
FIG. 15 is a flowchart showing an example of a second process.

FIG. 15 is a flowchart showing an example of a second process. In the example of FIG. 15, the acquirer 420 acquires camera data captured by the camera device installed in the monitoring target area (step S300). Subsequently, the analyzer 430 analyzes the acquired camera data (step S302). The manager 440 derives a degree of deviation between a road state based on camera data obtained as an analysis result and a road state based on a prescribed reference image (step S304). Subsequently, the determiner 442 determines whether or not the degree of deviation is greater than or equal to a threshold value (step S306). When it is determined that the degree of deviation is greater than or equal to the threshold value, the provider 450 generates information for promoting maintenance regarding at least one of the monitoring target area and the camera device (an example of the sensor device) (step S308) and causes the generated information to be output to the terminal device of the maintenance staff member, which is an example of the information providing device 200 (step S310). Thereby, the process of the present flowchart ends. In the processing of step S306, when it is determined that the degree of deviation is not greater than or equal to the threshold value, the process of the present flowchart ends.

<Third Process>

Figure 16:
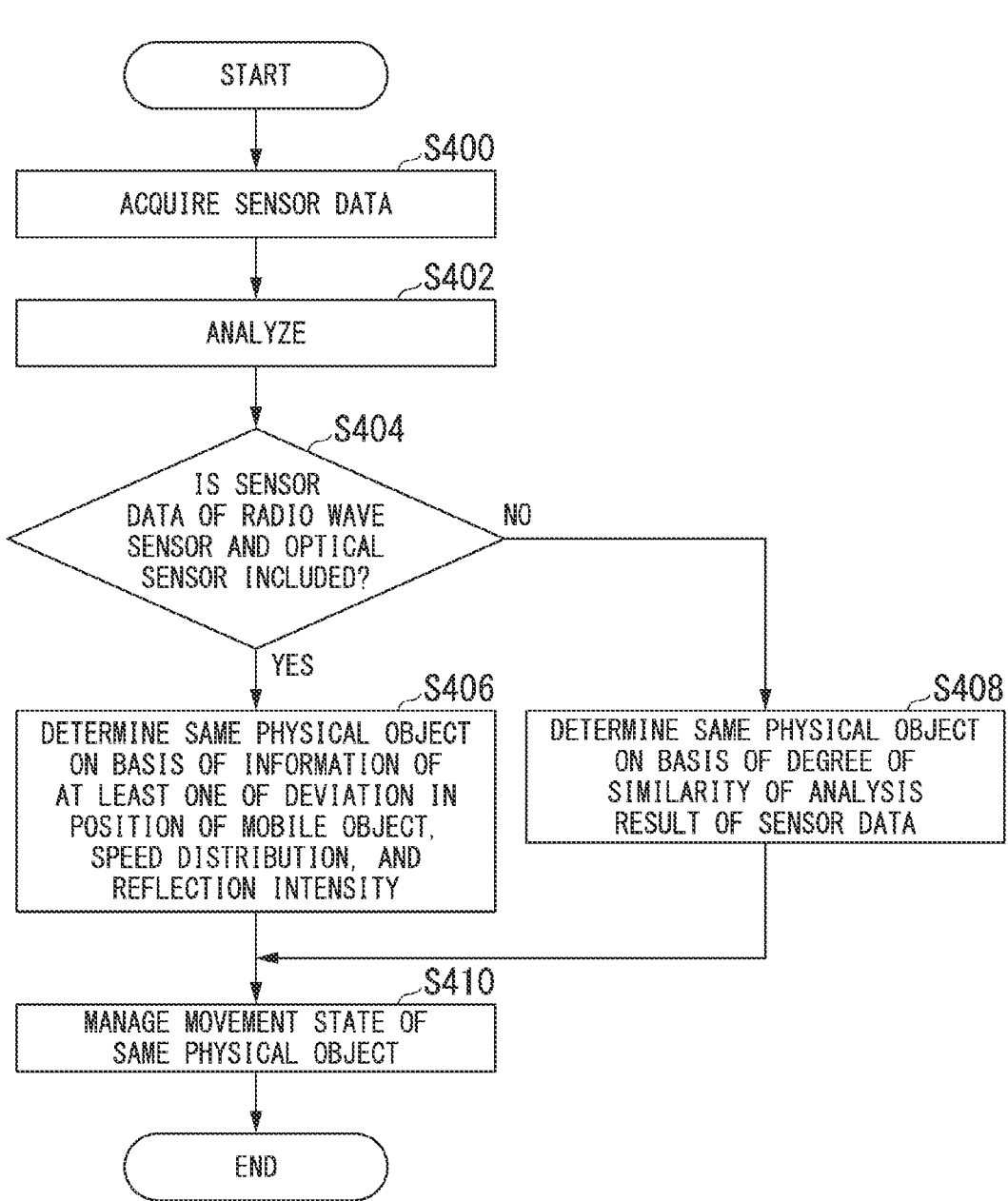
FIG. 16 is a flowchart showing an example of a third process.

FIG. 16 is a flowchart showing an example of a third process. In the example of FIG. 16, it is assumed that a plurality of sensor devices 100 installed in the monitoring target area are likely to include a radio wave sensor and an optical sensor. The process shown in FIG. 16 may be iteratively executed at a prescribed interval or at a prescribed timing. In the example of FIG. 16, the acquirer 420 acquires sensor data from the sensor device 100 (step S400). Subsequently, the analyzer 430 analyzes the acquired sensor data (step S402). Subsequently, the determiner 442 determines whether or not the sensor device 100, which has acquired the sensor data, includes sensor data of the radio wave sensor and the optical sensor. When it is determined that the sensor data of the radio wave sensor and the optical sensor is included, the determiner 442 determines the same physical object on the basis of information of at least one of deviations in positions of the mobile objects, speed distributions, and reflection intensities (step SS406). The deviation and speed distribution of the position of the mobile object are examples and other information regarding the movement of the mobile object may be used. When it is determined that the sensor data of the radio wave sensor and the optical sensor is not included (only sensor data of one sensor), the determiner 442 determines the same physical object on the basis of a degree of similarity of the analysis results of the sensors (step S408). Subsequently, the manager 440 manages the movement state of the same physical object (step S410). Thereby, the present flowchart ends. In the third monitoring process, after step S410, slip, lane departure, and the like of the same physical object may be monitored and information may be provided on the basis of a monitoring result. Furthermore, it may be monitored whether or not it comes into contact with other physical objects and information based on a monitoring result may be provided.

Modified Examples

At least some of the components of the area monitoring server 400 described above may be provided in the sensor device 100, the information providing device 200, or the vehicle 300. For example, when the functions of the analyzer 430 are provided in the sensor device 100 or the vehicle 300, analysis results are transmitted to the area monitoring server 400.

At least some of the components of the information providing device 200 in the embodiment may be provided in the sensor device 100 and at least some of the components of the sensor device 100 may be provided in the information providing device 200.

According to the above-described embodiment, the area monitoring system 1 includes the sensor device 100 installed at a position where a monitoring target area can be imaged; the analyzer 430 configured to analyze an image captured by the sensor device 100; the manager 440 configured to manage a movement situation of a mobile object moving on a road included in the monitoring target area on the basis of an analysis result of the analyzer 430; and the provider 450 configured to provide prescribed information to the mobile object, wherein the provider 450 provides an action instruction for the mobile object to the mobile object when the mobile object is likely to depart from the road on the basis of the movement situation, whereby it is possible to more appropriately monitor the monitoring target area. Therefore, it will contribute to the development of a sustainable transportation system.

For example, according to the embodiment, a plurality of sensor devices 100 provided in the monitoring target area can be linked to more accurately track a mobile object and ascertain a situation. According to the embodiment, an infrastructure cooperative monitoring system can be provided by effectively utilizing an infrastructure facility such as cameras installed in a prescribed area. Because the sensor device fixed to the monitoring target area has a fixed sensor range (an angle of view or the like), for example, because it is possible to acquire a road shape or a position of a road marking included in the acquired image, it is possible to ascertain a road situation or a movement situation of the mobile object moving on the road with higher accuracy. According to the embodiment, maintenance can be performed more appropriately and quickly for the area monitoring system 1. Thereby, infrastructure facilities can be operated appropriately. According to the embodiment, traffic management using a radio wave sensor and an optical sensor can be performed. Therefore, the optimal types and number of sensors can be installed for each monitoring target area in consideration of the characteristics of each sensor. Therefore, it is possible to more appropriately ascertain the situation of the entire region with infrastructure facilities.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An area monitoring method comprising:

analyzing, by a computer, an image captured by a plurality of sensor devices installed in fixed positions where at least part of a monitoring target area can be imaged;

performing, by the computer, image analysis processing on images captured by each of the plurality of sensor devices;

analyzing, by the computer, a surrounding condition of the plurality of sensor devices based on results of the image analysis processing;

managing, by the computer, a movement situation of a mobile object moving on a road included in the monitoring target area on the basis of an analysis result;

providing, by the computer, prescribed information to the mobile object;

assigning, by the computer, common identification information to mobile objects whose shapes match a threshold or higher in the images captured by the plurality of sensor devices obtained as a result of the image analysis processing;

tracking, by the computer, the movement situation of the mobile object, including its speed and direction of movement, from the images captured by the plurality of sensor devices for each of the assigned common identification information, and determining that the mobile object is likely to deviate from the road if it determines that the mobile object is likely to cross a road dividing line within a predetermined time period based on the speed and direction of movement of the mobile object and a positional relationship between the mobile object and the road dividing line around the mobile object; and facilitating, by the computer, a control of the mobile object according to an action instruction based on causing an information providing device installed near the mobile object to output information indicating an action instruction to the mobile object when the mobile object is likely to depart from the road on.

2. An area monitoring system comprising:

a plurality of sensor devices installed at a in fixed positions where at least part of a monitoring target area can be imaged;

an analyzer configured to perform image analysis processing on images captured by each of the plurality of sensor devices and analyze a surrounding condition of the plurality of sensor devices based on results of the image analysis processing;

a manager configured to manage a movement situation of a mobile object moving on a road included in the monitoring target area on the basis of an analysis result of the analyzer; and a provider configured to provide prescribed information to the mobile object, wherein the analyzer assigns common identification information to mobile objects whose shapes match a threshold or higher in the images captured by the plurality of sensor devices obtained as a result of the image analysis processing, wherein the manager tracks the movement situation of the mobile object, including its speed and direction of movement, from the images captured by the plurality of sensor devices for each of the assigned common identification information, and determines that the mobile object is likely to deviate from the road if it determines that the mobile object is likely to cross a road dividing line within a predetermined time period based on the speed and direction of movement of the mobile object and a positional relationship between the mobile object and the road dividing line around the mobile object, wherein the provider facilitates a control of the mobile object according to an action instruction based on causing an information providing device installed near the mobile object to output information indicating the action instruction to the mobile object when the mobile object is likely to depart from the road.

3. The area monitoring system according to claim 2, wherein the analyzer measures a travel period of time in which the mobile object travels in a prescribed segment included within the image, and wherein the manager estimates that an abnormality has occurred in the mobile object or the monitoring target area when a difference between the travel period of time and a prescribed reference travel period of time is greater than or equal to a threshold value.

4. The area monitoring system according to claim 2, wherein the manager determines that the mobile object is slipping when a change amount in a prescribed period of time at an angle formed by an extension direction of the road and a travel direction of the mobile object is greater than or equal to a threshold value.

5. The area monitoring system according to claim 2, wherein the manager manages the movement situation of the mobile object using an image from another mobile object capable of imaging a mobile object moving in a blind spot area not included in the plurality of sensor devices within the monitoring target area when the mobile object moves in the blind spot area.

6. The area monitoring system according to claim 2, wherein the manager predicts an occurrence of an abnormality of the mobile object when the mobile object is predicted to deviate from a sensor range of a first sensor device and move toward a sensor range of a second sensor device and when the second sensor device has not detected the mobile object within a prescribed period of time.

7. The area monitoring system according to claim 6, wherein the manager estimates that the mobile object has moved to a branching road when the second sensor device has not detected the mobile object within the prescribed period of time and when the branching road is located between the sensor range of the first sensor device and the sensor range of the second sensor device.

* * * * *